US008836181B2

(12) United States Patent
Iwase et al.

(10) Patent No.: US 8,836,181 B2
(45) Date of Patent: Sep. 16, 2014

(54) VEHICLE DRIVE DEVICE

(75) Inventors: Mikio Iwase, Anjo (JP); Tomohide Suzuki, Kariya (JP); Naoya Jinnai, Anjo (JP); Tatsuya Okishima, Chinyu (JP); Toshihiko Kamiya, Toyota (JP)

(73) Assignees: Aisin AW Co., Ltd., Anjo (JP); Toyota Jidosha Kabushiki Kaisha, Toyota-shi (JP)

( * ) Notice: Subject to any disclaimer, the term of this patent is extended or adjusted under 35 U.S.C. 154(b) by 873 days.

(21) Appl. No.: 12/948,297

(22) Filed: Nov. 17, 2010

(65) Prior Publication Data

US 2011/0121692 A1    May 26, 2011

(30) Foreign Application Priority Data

Nov. 19, 2009   (JP) ................. 2009-264381

(51) Int. Cl.
*H02K 7/11* (2006.01)
*B60W 10/08* (2006.01)
*B60K 6/42* (2007.10)

(52) U.S. Cl.
USPC ............... 310/67 R; 180/65.285; 180/65.22; 74/606 A

(58) Field of Classification Search
USPC .......... 180/65.21–65.29; 74/606 A; 310/67 R
See application file for complete search history.

(56) References Cited

U.S. PATENT DOCUMENTS

| | | | |
|---|---|---|---|
| 3,308,686 A | 3/1967 | Magg et al. | |
| 4,466,502 A | 8/1984 | Sakai | |
| 6,092,985 A | 7/2000 | Winkam | |
| 6,258,001 B1 | 7/2001 | Wakuta et al. | |
| 6,340,339 B1 | 1/2002 | Tabata et al. | |
| 6,341,584 B1 | 1/2002 | Itoyama et al. | |
| 6,492,742 B1 | 12/2002 | Fujikawa et al. | |
| 6,524,216 B2 * | 2/2003 | Suzuki et al. ............ | 477/3 |
| 6,533,692 B1 | 3/2003 | Bowen | |

(Continued)

FOREIGN PATENT DOCUMENTS

| CN | 134009 A | 3/2002 |
|---|---|---|
| CN | 1340009 A | 3/2002 |

(Continued)

OTHER PUBLICATIONS

Feb. 8, 2011 International Search Report issued in PCT/JP2010/070717 (with translation).

(Continued)

*Primary Examiner* — Jeffrey J Restifo
*Assistant Examiner* — Erez Gurari
(74) *Attorney, Agent, or Firm* — Oliff PLC

(57) ABSTRACT

A vehicle drive device, having a case with a support wall that extends at least radially, and an axially protruding portion that is cylindrically shaped integrally with the support wall and protrudes axially from the support wall toward a rotating electrical machine. A rotor support member is supported radially and axially so as to be rotatable with respect to the axially protruding portion via a support bearing provided on an outer or inner peripheral surface of the axially protruding portion. The element to be supplied with the oil pressure is positioned on a side axially opposite to the support wall. The vehicle drive device includes a supply oil passage, which is provided inside the support wall and the axially protruding portion, and has an end face opening that is formed in an end face located in a protruding direction of the axially protruding portion.

6 Claims, 9 Drawing Sheets

(56) References Cited

U.S. PATENT DOCUMENTS

| | | | |
|---|---|---|---|
| 6,585,066 B1* | 7/2003 | Koneda et al. | 180/65.25 |
| 6,590,306 B2* | 7/2003 | Terada | 310/75 C |
| 6,679,796 B2* | 1/2004 | Sugano | 474/28 |
| 6,719,076 B1 | 4/2004 | Tabata et al. | |
| 6,863,140 B2 | 3/2005 | Noreikat et al. | |
| 6,935,450 B1* | 8/2005 | Tsuzuki et al. | 180/65.26 |
| 7,059,443 B2* | 6/2006 | Kira | 180/243 |
| 7,086,978 B2* | 8/2006 | Aikawa et al. | 475/5 |
| 7,114,484 B2 | 10/2006 | Kaita et al. | |
| 7,114,604 B2 | 10/2006 | Masuya | |
| 7,396,308 B2* | 7/2008 | Tabata et al. | 475/159 |
| 7,489,114 B2 | 2/2009 | Nomura et al. | |
| 7,810,592 B2 | 10/2010 | Klemen et al. | |
| 7,954,578 B2 | 6/2011 | Kim et al. | |
| 8,155,848 B2 | 4/2012 | Kobayashi et al. | |
| 8,322,504 B2 | 12/2012 | Mueller et al. | |
| 8,333,680 B2 | 12/2012 | Kasuya et al. | |
| 8,360,186 B2* | 1/2013 | Yamamoto et al. | 180/65.51 |
| 8,590,649 B2* | 11/2013 | Osawa et al. | 180/65.51 |
| 8,602,940 B2* | 12/2013 | Kuwahara et al. | 477/86 |
| 8,636,090 B2* | 1/2014 | Nomura et al. | 180/65.22 |
| 2002/0043883 A1 | 4/2002 | Shimizu | |
| 2003/0127262 A1 | 7/2003 | Noreikat et al. | |
| 2004/0029677 A1 | 2/2004 | Mori et al. | |
| 2004/0154846 A1* | 8/2004 | Kira | 180/65.6 |
| 2005/0066933 A1 | 3/2005 | Kaita et al. | |
| 2005/0079942 A1 | 4/2005 | Bauknecht et al. | |
| 2006/0100060 A1 | 5/2006 | Kraska et al. | |
| 2006/0272869 A1 | 12/2006 | Hidaka et al. | |
| 2006/0289209 A1 | 12/2006 | Grosspietsch et al. | |
| 2007/0108857 A1 | 5/2007 | Nomura et al. | |
| 2007/0175723 A1 | 8/2007 | Blessing et al. | |
| 2007/0175726 A1 | 8/2007 | Combes et al. | |
| 2008/0047799 A1 | 2/2008 | Combes et al. | |
| 2009/0054203 A1 | 2/2009 | Heeke | |
| 2009/0100965 A1* | 4/2009 | Sanji et al. | 74/606 R |
| 2009/0271079 A1 | 10/2009 | Kobayashi et al. | |
| 2009/0283344 A1 | 11/2009 | Arnold et al. | |
| 2010/0038201 A1 | 2/2010 | Mueller et al. | |
| 2010/0062899 A1 | 3/2010 | Engelmann et al. | |
| 2010/0105518 A1 | 4/2010 | Kasuya et al. | |
| 2010/0132504 A1* | 6/2010 | Miller et al. | 74/606 A |
| 2010/0236856 A1* | 9/2010 | Nomura et al. | 180/292 |
| 2011/0118079 A1 | 5/2011 | Mueller et al. | |
| 2011/0121692 A1* | 5/2011 | Iwase et al. | 310/67 R |
| 2011/0240430 A1* | 10/2011 | Iwase et al. | 192/3.29 |
| 2011/0240431 A1* | 10/2011 | Iwase et al. | 192/3.29 |
| 2012/0217830 A1 | 8/2012 | Iwase et al. | |
| 2012/0247911 A1* | 10/2012 | Noda et al. | 192/113.32 |
| 2012/0258838 A1* | 10/2012 | Hartz et al. | 477/5 |
| 2012/0318630 A1 | 12/2012 | Iwase et al. | |
| 2012/0319514 A1 | 12/2012 | Iwase et al. | |
| 2013/0008284 A1* | 1/2013 | Sada et al. | 74/661 |
| 2013/0009522 A1* | 1/2013 | Ozaki et al. | 310/67 R |
| 2013/0057117 A1* | 3/2013 | Suzuki et al. | 310/60 R |

FOREIGN PATENT DOCUMENTS

| | | |
|---|---|---|
| CN | 101018687 A | 8/2007 |
| DE | 10 2004 033 141 A1 | 2/2006 |
| DE | 10 2009 022 272 A1 | 12/2009 |
| EP | 1 800 929 A2 | 6/2007 |
| FR | 2 830 589 A1 | 4/2003 |
| JP | U-3-69748 | 7/1991 |
| JP | B2-03-072507 | 11/1991 |
| JP | A-07-217724 | 8/1995 |
| JP | A-08-277859 | 10/1996 |
| JP | B2 3080612 | 8/2000 |
| JP | A-2002-220078 | 8/2002 |
| JP | A-2005-212494 | 8/2005 |
| JP | A 2006-137406 | 6/2006 |
| JP | A-2007-015810 | 1/2007 |
| JP | A-2007-071083 | 3/2007 |
| JP | A-2007-118717 | 5/2007 |
| JP | A-2009-001127 | 1/2009 |
| JP | A 2009-001165 | 1/2009 |
| JP | A-2009-11010 | 1/2009 |
| JP | A 2009-101730 | 5/2009 |
| JP | A-2009-262659 | 11/2009 |
| WO | WO 2008/092426 A2 | 8/2008 |
| WO | WO 2010/017786 A1 | 2/2010 |

OTHER PUBLICATIONS

Dec. 26, 2012 Office Action issued in U.S. Appl. No. 13/522,135.
Feb. 4, 2013 Office Action issued in U.S. Appl. No. 12/926,446.
Nice et al., "How Clutches Work," *HowStuffWorks.com*, Oct. 16, 2007, <http://auto.howstuffworks.com/clutch.htm>.
Office Action issued in U.S. Appl. No. 13/502,909 dated Mar. 6, 2014.
Office Action issued in U.S. Appl. No. 13/522,597 dated Mar. 7, 2014.
Mar. 18, 2013 Office Action issued in U.S. Appl. No. 12/926,447.
Mar. 28, 2013 Notification of Reasons for Refusal issued in Japanese Patent Application No. 2010-049193 (partial translation).
U.S. Appl. No. 13/522,597, filed Jul. 17, 2012 in the name of Daiki Suyama et al.
U.S. Appl. No. 13/522,426, filed Jul. 16, 2012 in the name of Daiki Suyama et al.
U.S. Appl. No. 13/522,135, filed Jul. 13, 2012 in the name of Mikio Iwase et al.
U.S. Appl. No. 12/926,446, filed Nov. 18, 2010 in the name of Mikio Iwase et al.
U.S. Appl. No. 13/502,909, filed Apr. 19, 2012 in the name of Mikio Iwase et al.
U.S. Appl. No. 12/926,447, filed Nov. 18, 2010 in the name of Mikio Iwase et al.
U.S. Appl. No. 13/522,651, filed Jul. 17, 2012 in the name of Mikio Iwase et al.
Aug. 2, 2013 Office Action issued in U.S. Appl. No. 13/522,597, filed Jul. 17, 2012 in the name of Suyama.
Aug. 30, 2013 Notice of Allowance issued in U.S. Appl. No. 12/926,446.
Nov. 7, 2013 Notification of Reason(s) for Refusal issued in Japanese Patent Application No. 2010-246515 (partial translation).
Oct. 17, 2013 Office Action issued in U.S. Appl. No. 12/926,447.
May 6, 2011 Search Report issued in International Patent Application No. PCT/JP2011/053886.
May 11, 2011 Search Report issued in International Patent Application No. PCT/JP2011/053887.
Jul. 8, 2011 Search Report issued in International Patent Application No. PCT/JP2011/055720.
May 31, 2011 Search Report issued in International Patent Application No. PCT/JP2011/055721.
Feb. 8, 2011 Search Report issued in International Patent Application No. PCT/JP2010/070714 (with translation).
Feb. 8, 2011 Search Report issued in International Patent Application No. PCT/JP2010/070715 (with translation).
Feb. 8, 2011 Search Report issued in International Patent Application No. PCT/JP2010/070716 (with translation).
Apr. 26, 2013 Notice of Allowance issued in U.S. Appl. No. 12/926,446.
Jun. 27, 2013 Notification of Reason(s) for Refusal issued in Japanese Patent Application No. 2010-246511, (parital translation only).
Dec. 9, 2013 Corrected Notice of Allowability issued in U.S. Appl. No. 12/926,446.
Apr. 25, 2014 Notice of Allowance issued in U.S. Appl. No. 13/522,426.
May 6, 2014 Office Action issued in U.S. Appl. No. 12/926,447.
Jun. 22, 2014 Notice of Allowance issued in U.S. Appl. No. 13/502,909.

* cited by examiner

F I G . 6
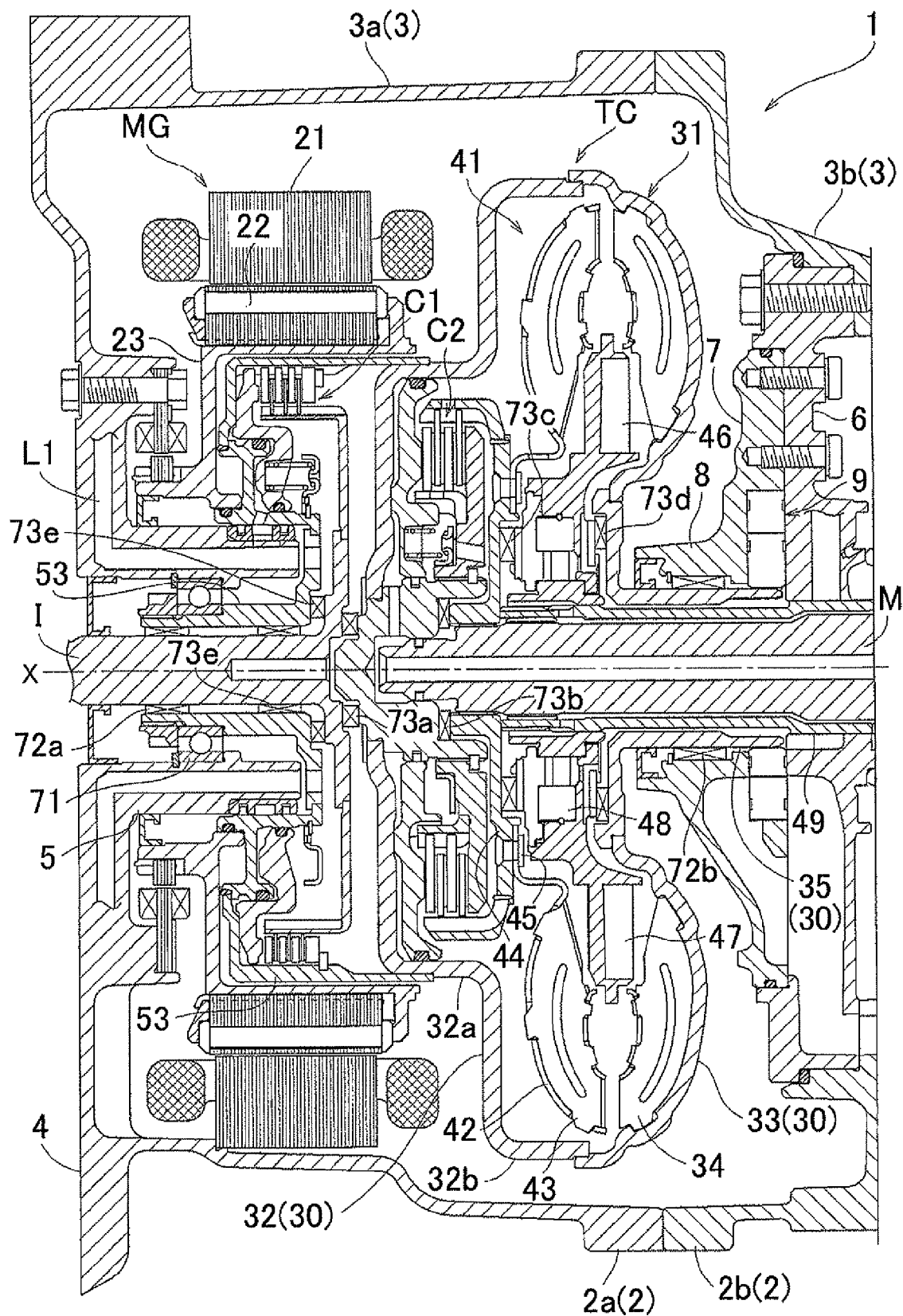

VEHICLE DRIVE DEVICE

INCORPORATION BY REFERENCE

The disclosure of Japanese Patent Application No. 2009-264381 filed on Nov. 19, 2009 including the specification, drawings and abstract is incorporated herein by reference in its entirety.

BACKGROUND OF THE INVENTION

The present invention relates to vehicle drive devices, which include a rotating electrical machine having a rotor that rotates about a central axis, a case that accommodates the rotating electrical machine, and an oil passage provided in the case to supply oil to a predetermined element to be supplied with an oil pressure.

DESCRIPTION OF THE RELATED ART

For example, a device described in Japanese Patent Application Publication No. JP-A-2009-001127 below is known as a vehicle drive device which includes a rotating electrical machine having a rotor that rotates about a central axis, a case that accommodates the rotating electrical machine, and an oil passage provided in the case to supply oil to a predetermined element to be supplied with an oil pressure. This vehicle drive device includes an engine input shaft drivingly connected to an engine, a motor generator as a rotating electrical machine, a clutch as a friction engagement device, a torque converter as a hydraulic transmission device, and a transmission input shaft drivingly connected to the engine input shaft via the clutch and the torque converter. The engine input shaft, the motor generator, the clutch, the torque converter, and the transmission input shaft are accommodated in a transaxle housing as a case. In the vehicle drive device described in Japanese Patent Application Publication No. JP-A-2009-001127, an oil passage, which is provided in the transaxle housing to supply oil to a predetermined element to be supplied with an oil pressure such as the clutch, is formed inside the engine input shaft and the transmission input shaft.

In such a vehicle drive device, rotating members, such as a rotor of the motor generator and the torque converter, need to be supported via a bearing so as to rotate or relatively rotatable with respect to each other. In this case, it is preferable to ensure high accuracy of the central axis, namely high accuracy of radial support. In this regard, in the vehicle drive device described in Japanese Patent Application Publication No. JP-A-2009-001127, the rotor of the motor generator and the torque converter are connected together so as to rotate together, and the rotor and the torque converter, which rotate together, are supported at a shaft end portion on one axial side of the engine input shaft so as to be rotatable relative to the engine input shaft. The rotor and the torque converter are radially supported on the other axial side of the engine input shaft so as to be rotatable relative to the inner peripheral surface of a sleeve formed at one axial end of a crankshaft of the engine via a bearing. A thrust bearing is provided between two members that are axially adjacent to each other and rotate at different rotational speeds, such as between a portion that extends radially from the engine input shaft and the transaxle housing, in order to axially support the two members.

SUMMARY OF THE INVENTION

However, the use of such a support structure necessarily causes radial vibrations due to whirling of the engine crankshaft itself about the central axis. This necessarily reduces the accuracy of the central axis of the rotor that is supported by the crankshaft via a bearing. Moreover, in this support structure as described above, the length of the rotor support path increases according to the axial length of the engine input shaft. In this regard as well, the accuracy of the central axis of the rotor tends to be reduced. Regarding an oil passage structure for supplying oil to the clutch and the like as well, it is often difficult in terms of processing to form a plurality of axial oil passages inside the engine input shaft due to the limited diameter of the engine input shaft.

In order to ensure high accuracy of the central axis of the rotor, it is effective to directly support the rotor on the transaxle housing as a non-rotating member only via a bearing. In this case, a radially extending support wall of the transaxle housing can be provided with an axially protruding portion that axially protrudes from the support wall so that the rotor is supported on the outer peripheral surface of the axially protruding portion via a bearing. Further in this case, it is also possible to form a plurality of oil passages for supplying oil to the clutch and the like, inside the support wall of the transaxle housing and the axially protruding portion. However, in the case of using this structure, a thrust bearing is typically positioned between an axial end face of the axially protruding portion and other rotating member that is positioned axially adjacent to the axially protruding portion. The rotating member is axially supported so as to be rotatable with respect to the axially protruding portion via the thrust bearing. Since the trust bearing is positioned on the axial end face of the axially protruding portion, the plurality of oil passages, which are formed inside the axially protruding portion, need to be formed so that the openings thereof are axially arranged in the outer peripheral surface of the axially protruding portion. This causes a problem that the overall axial length of the vehicle drive device is increased by an amount corresponding to the thrust bearing provided, and an amount corresponding to the openings of the plurality of oil passages which are axially arranged in the outer peripheral surface of the axially protruding portion.

Thus, it is desired to implement a vehicle drive device that is capable of reducing the overall axial length of the device while ensuring high accuracy of the central axis of a rotor of a rotating electrical machine.

A vehicle drive device according to a first aspect of the present invention includes: a rotating electrical machine having a rotor that rotates about a central axis; a case accommodating the rotating electrical machine; and an oil passage provided in the case to supply oil to an predetermined element to be supplied with an oil pressure. The vehicle drive device has a characteristic structure in which the case has a support wall that extends at least radially, and an axially protruding portion that is cylindrically shaped and formed integrally with the support wall and protrudes axially from the support wall toward the rotating electrical machine, a rotor support member that extends at least radially to support the rotor is supported radially and axially so as to be rotatable with respect to the axially protruding portion via a support bearing that is provided on an outer peripheral surface or an inner peripheral surface of the axially protruding portion, the element to be supplied with the oil pressure is positioned on a side axially opposite to the support wall with respect to the rotor support member, and an accommodating member that accommodates the element to be supplied with the oil pressure is positioned axially in contact with the rotor support member, the vehicle drive device includes a supply oil passage to the element to be supplied with the oil pressure, which is provided inside the support wall and the axially protruding portion, and the supply oil passage has an end face opening that is formed in an end face located in a protruding direction of the axially protruding portion.

As used herein, the term "axial" indicates a direction of a rotation central axis of the rotor. Thus, the term "radial" indicates a direction perpendicular to the rotation central axis of the rotor, and the term "circumferential" indicates a circumferential direction about the rotation central axis of the rotor.

The term "rotating electrical machine" is herein used as a concept including a motor (an electric motor), a generator (an electric generator), and a motor generator functioning both as the motor and the generator as needed.

According to the first aspect, the rotor support member that supports the rotor is rotatably supported on the axially protruding portion via the support bearing provided on the outer peripheral surface or the inner peripheral surface of the axially protruding portion that forms a part of the case as a non-rotating member. Thus, high accuracy of the central axis of the rotor is easily ensured. Since the rotor can be supported radially inside the rotor on the axially protruding portion by the radially extending rotor support member. This enables a short rotor support path to be implemented, and in this regard as well, high accuracy of the central axis of the rotor can be easily ensured.

The rotor support member is supported not only radially but also axially so as to be rotatable with respect to the axially protruding portion via the support bearing. The accommodating member that accommodates the element to be supplied with the oil pressure is axially supported in contact with the rotor support member. Thus, depending on the design of the shape of the accommodating member, there can be no need to provide a thrust bearing between an axial end face of the axially protruding portion and other rotating member positioned axially adjacent to the axially protruding portion. Thus, the overall axial length of the device can be reduced by an amount corresponding to the thrust bearing that can be omitted. Since the thrust bearing can be omitted, the axial end face of the axially protruding portion is open without being blocked by the thrust bearing. Thus, the supply oil passage for supplying oil to the predetermined element to be supplied with the oil pressure provided on a side axially opposite to the support wall with respect to the rotor support member can have an opening in the axial end face of the axially protruding portion. Accordingly, at least one of supply oil passages provided inside the support wall and the axially protruding portion can have an opening in the axial end face of the axially protruding portion, and thus need not have an opening in the outer peripheral surface of the axially protruding portion. This can reduce the overall axial length of the device by an amount corresponding to the axial length that is required to form the opening of the supply oil passage in the outer peripheral surface of the axially protruding portion.

Thus, according to the above characteristic structure, a vehicle drive device capable of ensuring high accuracy of the central axis of the rotor of the rotating electrical machine while reducing the overall axial length of the device can be provided.

According to a second aspect of the present invention, the element to be supplied with the oil pressure may be a friction engagement device which has an engagement oil chamber and a plurality of friction materials, and whose engagement and disengagement are controlled by controlling a supply pressure of oil to the engagement oil chamber, the supply oil passage and the end face opening may serve as a first supply oil passage and a first opening, respectively, in addition to the first supply oil passage, the vehicle drive device may further include a second supply oil passage, which is formed inside the support wall and the axially protruding portion, and has a second opening that is formed in the outer peripheral surface of the axially protruding portion, and the first supply oil passage may serve as a supply passage for oil to be supplied to the friction materials, and the second supply oil passage may serve as a supply passage for oil to be supplied to the engagement oil chamber.

According to the second aspect, engagement and disengagement of the friction engagement device can be appropriately controlled by appropriately controlling the engagement state of the plurality of friction materials of the friction engagement device by controlling a supply pressure of the oil to be supplied from the second supply oil passage to the engagement oil chamber. When the plurality of friction materials engage with each other, the plurality of friction materials generate heat. However, the plurality of friction materials can be appropriately cooled by oil supplied from the first supply oil passage. The plurality of friction materials, a path from the first supply oil passage to the plurality of friction materials, a bearing provided downstream of the plurality of friction materials in the path, and the like can be appropriately lubricated by the oil supplied from the first supply oil passage.

At this time, the supply pressure of the oil supplied to the engagement oil chamber to control engagement and disengagement of the friction engagement device need to be controlled more precisely than the supply pressure of the oil to be supplied for cooling, lubrication, or the like. Thus, a path from the second supply oil passage to the engagement oil chamber is preferably made as fluid-tight as possible. In the above structure, the opening of the second supply oil passage is formed in the outer peripheral surface of the axially protruding portion. Thus, the path from the second supply oil passage for which higher fluid-tightness is required compared to the first supply oil passage can be appropriately made fluid-tight by using, e.g., a commonly used sealing member such as a seal ring.

Thus, according to the above structure, engagement and disengagement of the friction engagement device can be appropriately controlled, and the plurality of friction materials and the like can be appropriately cooled and lubricated, while reducing the overall axial length of the vehicle drive device.

According to a third aspect of the present invention, the supply oil passage and the end face opening may serve as a first supply oil passage and a first opening, respectively, and in addition to the first supply oil passage, the vehicle drive device may further include a discharge oil passage, which is formed inside the support wall and the axially protruding portion, and has a discharge opening that is formed in the end face located in the protruding direction of the axially protruding portion or in the inner peripheral surface of the axially protruding portion.

According to the third aspect, the oil supplied through the first supply oil passage to the predetermined element to be supplied with the oil pressure can be appropriately discharged through the discharge oil passage formed inside the support wall and the axially protruding portion. Thus, a sequential oil flow can be appropriately formed from the first supply oil passage via the element to be supplied with the oil pressure to the discharge oil passage.

According to a fourth aspect of the present invention, the vehicle drive device may further include: a hydraulic transmission device having a driving rotating member and a driven rotating member, and structured to be able to transfer a driving force via a fluid contained in the hydraulic transmission device; and a hydraulic transmission device support member that forms the accommodating member and also supports the hydraulic transmission device, wherein the hydraulic transmission device support member is connected to the rotor support member, and axially on the support wall side of the hydraulic transmission device, the hydraulic transmission device support member is supported radially and axially so as to be rotatable with respect to the axially protruding portion via the support bearing.

According to the fourth aspect, the hydraulic transmission device support member that supports the hydraulic transmission device is connected to the rotor support member, and is rotatably supported integrally with the rotor support member on the axially protruding portion via the support bearing provided on the outer peripheral surface or the inner peripheral surface of the axially protruding portion that forms a part of the case as a non-rotating element member. Thus, high accuracy of the central axis of the hydraulic transmission device can be easily ensured.

Moreover, the accommodating member that accommodates the element to be supplied with the oil pressure is formed by using the hydraulic transmission device support member that is typically shaped so as to have a predetermined axial length. This can easily eliminate the need to provide a thrust bearing between the axial end face of the axially protruding portion and another rotating element positioned axially adjacent to the axially protruding portion. Thus, the overall axial length of the device can be easily reduced.

Therefore, a vehicle drive device capable of reducing the overall axial length of the device while ensuring high accuracy of the central axis of the hydraulic transmission device in addition to high accuracy of the central axis of the rotor of the rotating electrical machine can be provided according to the above structure.

Note that in this case, the present invention may use structures such as a structure in which the rotor support member is supported on the outer peripheral surface of the axially protruding portion via the support member, and axially on the support wall side of the hydraulic transmission device, the hydraulic transmission device support member is supported on the outer peripheral surface of the axially protruding portion via the rotor support member and the support bearing, or a structure in which, axially on the support wall side of the hydraulic transmission device, the hydraulic transmission device support member is supported on the inner peripheral surface of the axially protruding portion via the support bearing, and the rotor support member is supported on the inner peripheral surface of the axially protruding portion via the hydraulic transmission device support member and the support bearing.

According to the aspects above, the structure in which the rotor support member and the rotor, and the hydraulic transmission device support member and the hydraulic transmission device are rotatably supported on the outer peripheral surface or the inner peripheral surface of the axially protruding portion can be appropriately implemented. Note that in the former structure, the rotor support member can be rotatably supported on the axially protruding portion with the support bearing interposed between the inner peripheral surface of the radially extending rotor support member and the outer peripheral surface of the axially protruding portion. Thus, a short rotor support path can be very easily implemented, whereby high accuracy of the central axis of the rotor can be especially easily ensured.

According to a fifth aspect of the present invention, the rotor support member may have a cylindrical inner peripheral surface portion, an internal spline engagement groove formed in the inner peripheral surface portion, and a first cylindrical protruding portion that is cylindrically shaped and protrudes axially toward the hydraulic transmission device support member, the hydraulic transmission device support member may have a cylindrical outer peripheral surface portion, an external spline engagement groove formed in the outer peripheral surface portion, and a second cylindrical protruding portion that is cylindrically shaped and protrudes axially toward the rotor support member, the internal spline engagement groove may engage with the external spline engagement groove, and the first cylindrical protruding portion may fit on the second cylindrical protruding portion so as to restrict radial relative movement between the rotor support member and the hydraulic transmission device support member, and an axial end face of the first cylindrical protruding portion may be in contact with the hydraulic transmission device support member, or an axial end face of the second cylindrical protruding portion is in contact with the rotor support member.

According to the fifth aspect, the hydraulic transmission device support member can be appropriately axially supported by the rotor support member by bringing the axial end face of the first cylindrical protruding portion into contact with the hydraulic transmission device support member or by bringing the axial end face of the second cylindrical protruding portion into contact with the rotor support member. Moreover, engaging the internal spline engagement groove of the rotor support member with the external spline engagement groove of the hydraulic transmission device support member can facilitate circumferential positioning of the rotor support member and the hydraulic transmission device support member, and can appropriately implement a structure in which the rotor support member and the hydraulic transmission device support member rotate together. Fitting the first cylindrical protruding portion of the rotor support member on the second cylindrical protruding portion of the hydraulic transmission device support member in this state can facilitate radial positioning between the rotor support member and the hydraulic transmission device support member.

According to a sixth aspect of the present invention, the element to be supplied with the oil pressure may be positioned radially inside the rotor so as to axially overlap the rotor.

As used herein, the term "overlap" between two members in a certain direction indicates that each of the two members has at least a part located at the same position as viewed in that direction.

According to the sixth aspect, the element to be supplied with the oil pressure and the rotor are positioned so that each element to be supplied with the oil pressure and the rotor has a part located at the same position as viewed axially. This can reduce the overall axial length of the vehicle drive device by an amount corresponding to the axial length of the part located at the same position, as compared to the case where the element to be supplied with the oil pressure and the rotor are positioned so as not to axially overlap each other.

BRIEF DESCRIPTION OF THE DRAWINGS

FIG. 6 is a partial cross-sectional view of a hybrid drive device according to a second embodiment;

DETAILED DESCRIPTION OF THE EMBODIMENTS

1. First Embodiment

Figure 2:
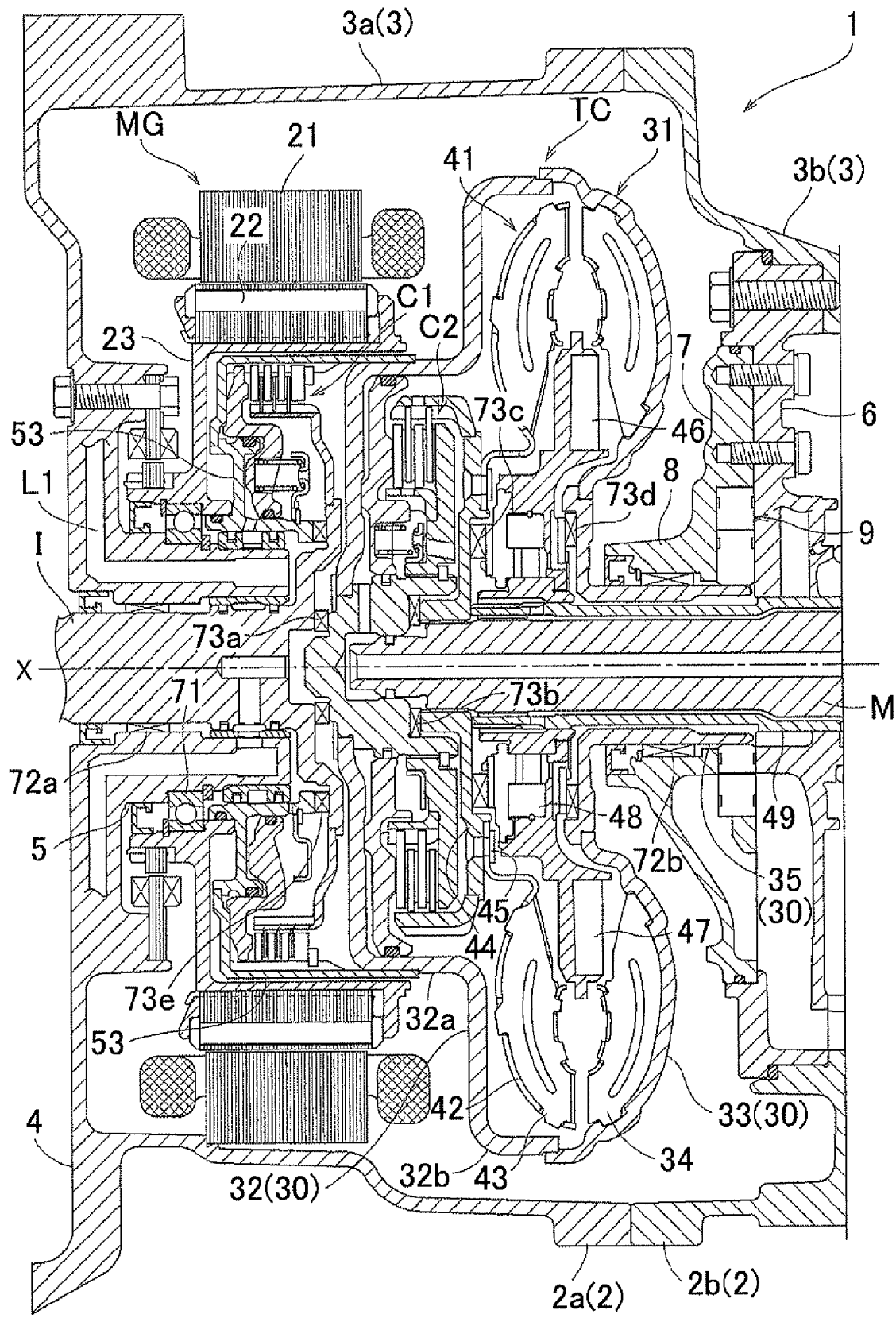
FIG. 2 is a partial cross-sectional view of the hybrid drive device according to the first embodiment.

A first embodiment of the present invention will be described with reference to the accompanying drawings. The present embodiment will be described with respect to an example in which a vehicle drive device of the present invention is applied to a hybrid drive device 1. The hybrid drive device 1 is a drive device for hybrid vehicles that use one or both of an engine E and a rotating electrical machine MG as a driving force source of the vehicle. As shown in FIG. 2, this hybrid drive device 1 includes: a rotating electrical machine MG having a rotor 22 that rotates about a central axis X; a drive device case 2 that accommodates the rotating electrical machine MG (hereinafter simply referred to as the "case 2"); and an oil passage L1 provided in the case 2 to supply oil to a first clutch C1 as a predetermined element to be supplied with an oil pressure.

Figure 3:
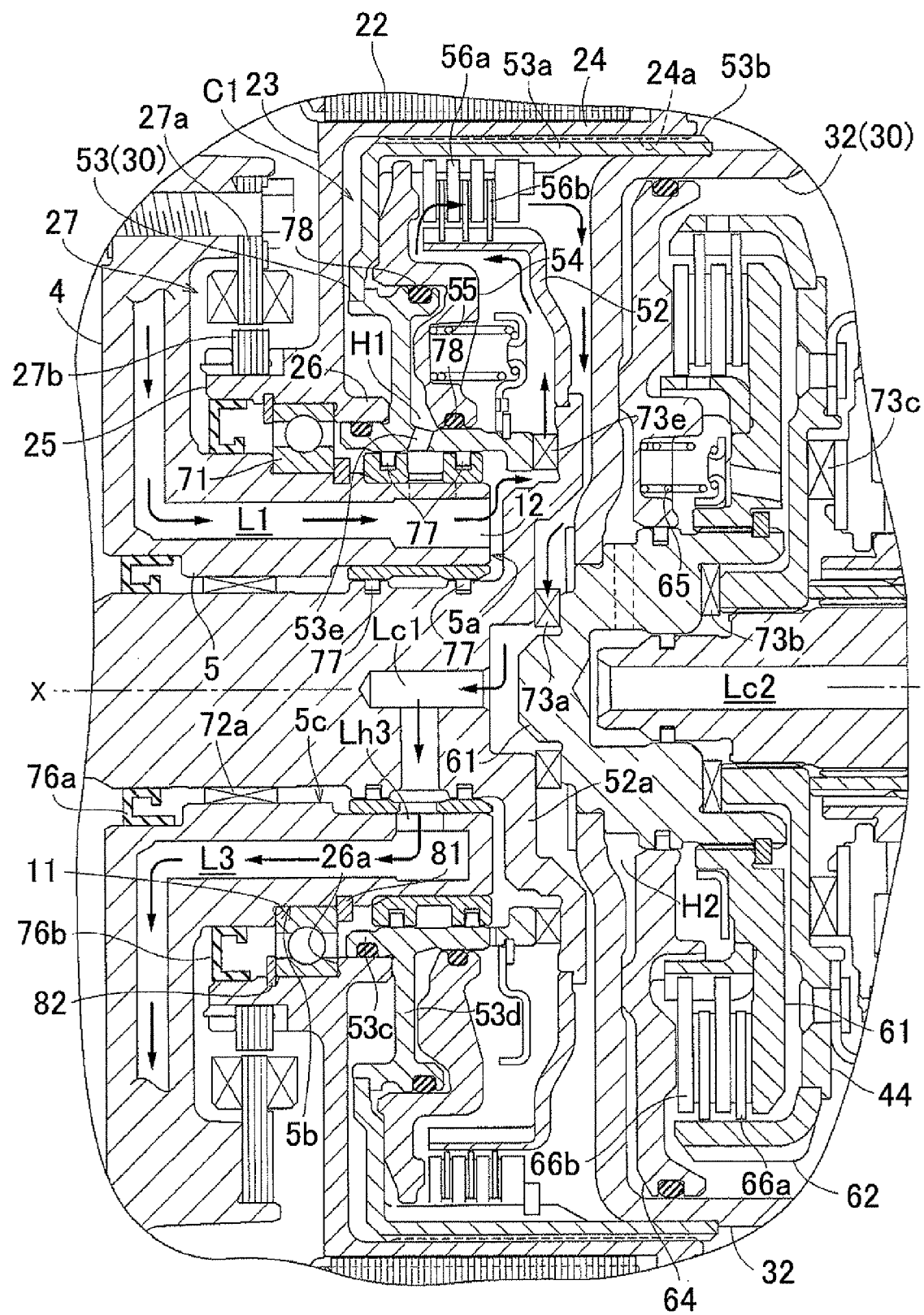
FIG. 3 is a cross-sectional view of a main part of the hybrid drive device according to the first embodiment.
Figure 4:
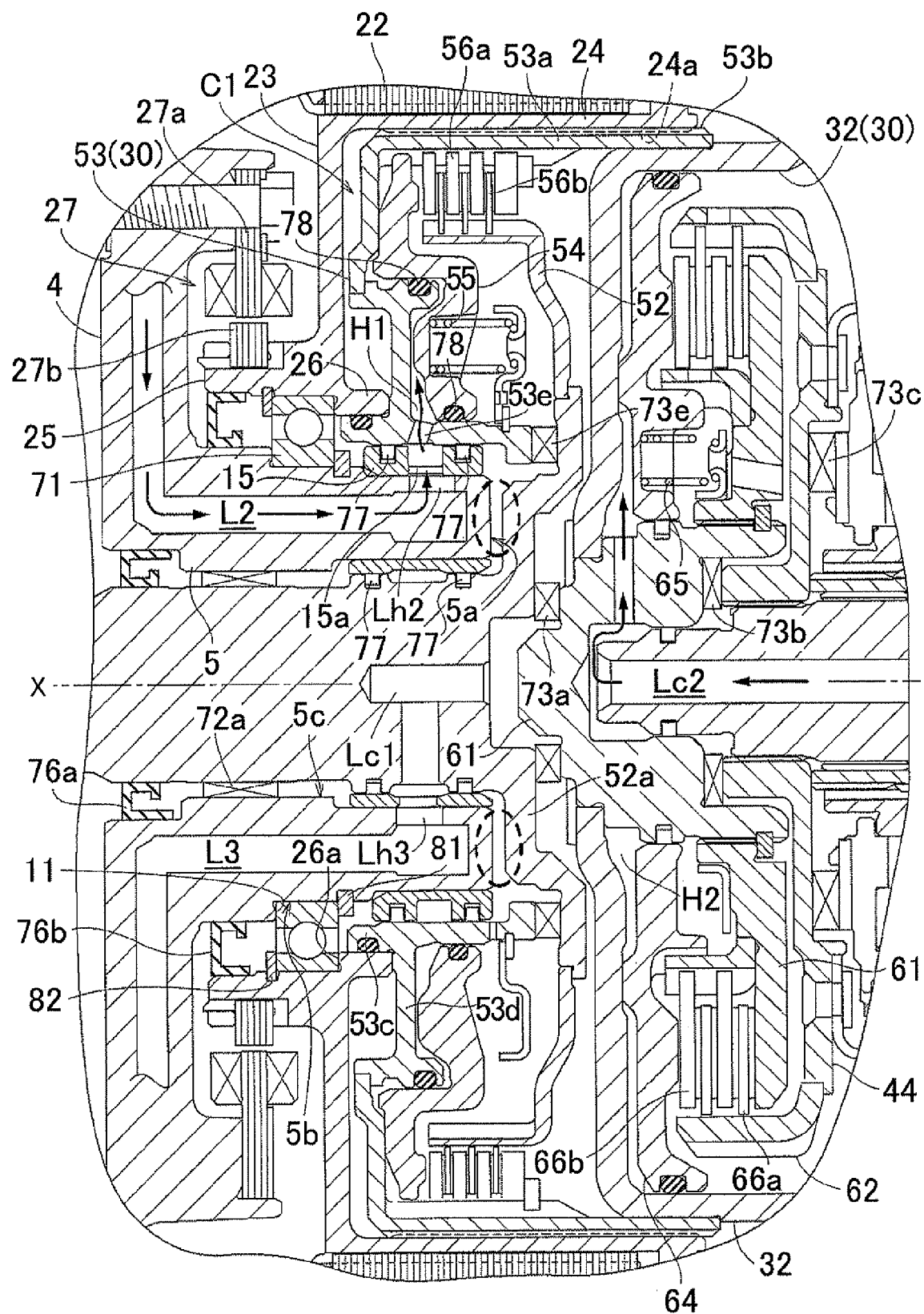
FIG. 4 is a cross-sectional view of the main part of the hybrid drive device according to the first embodiment.
Figure 5:
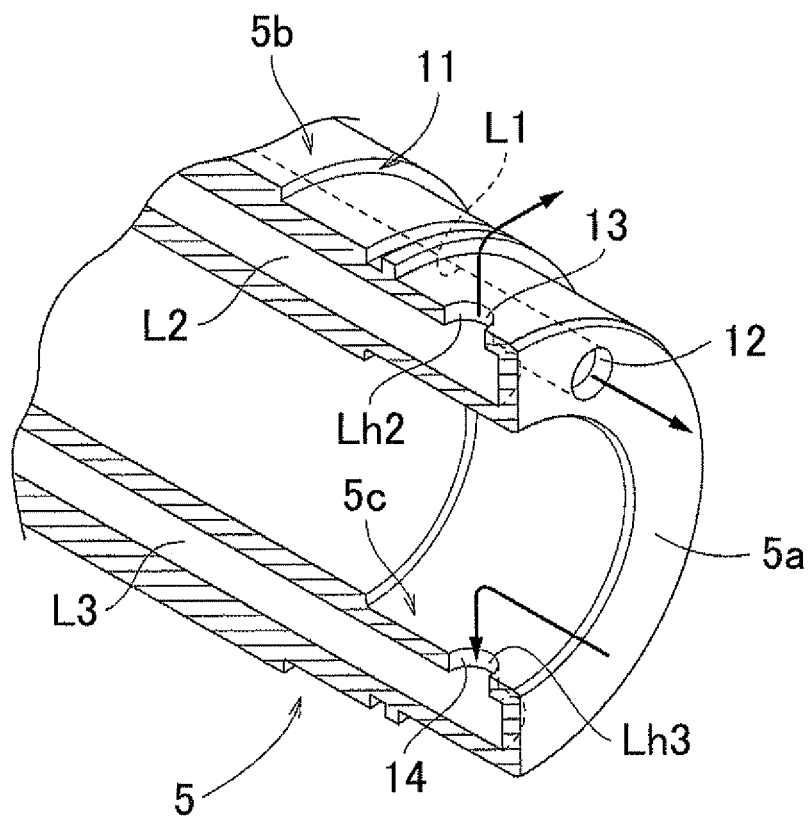
FIG. 5 is a perspective cross-sectional view of oil passages inside a case according to the first embodiment.

In this structure, as shown in FIGS. 3 to 5, the hybrid drive device 1 of the present embodiment includes the following characteristic structures. The case 2 has an end support wall 4, and a cylindrical axially protruding portion 5 that is formed integrally with the end support wall 4 and protrudes axially toward the rotating electrical machine MG. A rotor support member 23, which extends radially and supports the rotor 22, is supported radially and axially so as to be rotatable with respect to the axially protruding portion 5 via a support bearing 71 that is provided on an outer peripheral surface 5b of the axially protruding portion 5. The first clutch C1 is positioned on the side axially opposite to the end support wall 4 with respect to the rotor support member 23. An accommodating member that accommodates the first clutch C1 is positioned axially in contact with the rotor support member 23. The first supply oil passage L1 to the first clutch C1 is provided inside the end support wall 4 and the axially protruding portion 5, and the first supply oil passage L1 has a first opening 12 that is formed in an axial end face 5a of the axially protruding portion 5. Thus, the hybrid drive device 1 is implemented which is capable of reducing the overall axial length of the device while ensuring high accuracy of the central axis of the rotor 22 of the rotating electrical machine MG. The hybrid drive device 1 of the present embodiment will be described in detail below.

1-1. Overall Structure of Hybrid Drive Device

Figure 1:
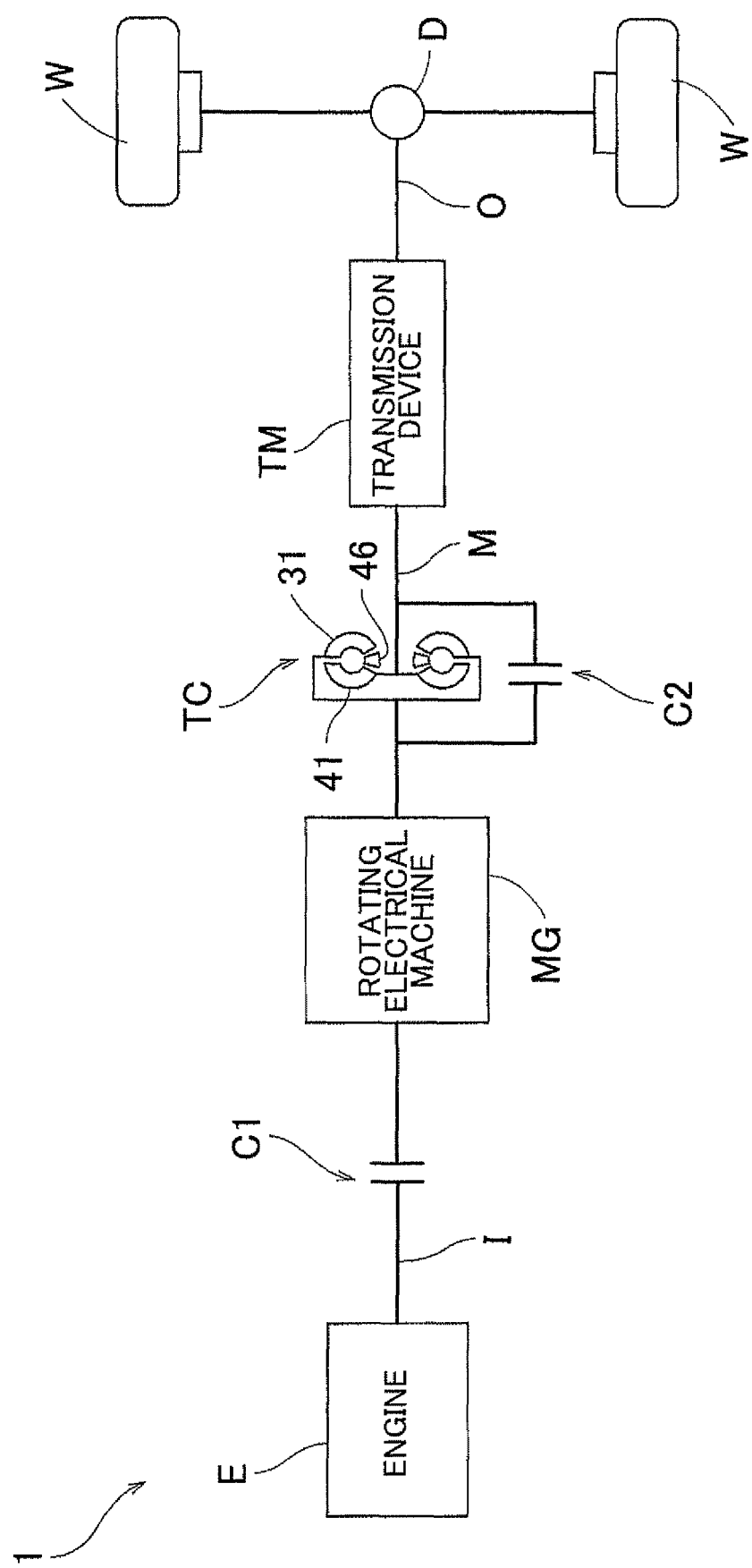
FIG. 1 is a schematic diagram showing the general structure of a hybrid drive device according to a first embodiment.

First, the overall structure of the hybrid drive device 1 of the present embodiment will be described below. As shown in FIG. 1, the hybrid drive device 1 includes an input shaft I drivingly connected to the engine E as a first driving force source, an output shaft O drivingly connected to wheels W, the rotating electrical machine MG as a second driving force source, a torque converter TC, a transmission device TM. The hybrid drive device 1 further includes the first clutch C1 for allowing and blocking transmission of a driving force between the engine E and the rotating electrical machine MG. In the present embodiment, the first clutch C1 corresponds to a "friction engagement device" as an element to be supplied with an oil pressure in the present invention, and the torque converter TC corresponds to a "hydraulic transmission device" in the present invention.

The engine E is an internal combustion engine that is driven by combustion of fuel, and for example, various known engines such as a gasoline engine and a diesel engine can be used as the engine E. In the present example, an engine output shaft, such as a crankshaft of the engine E, is drivingly connected to the input shaft I. The engine E and the input shaft I are drivingly connected to the rotating electrical machine MG via the first clutch C1 selectively. In an engaged state of the first clutch C1, the engine E and the rotating electrical machine MG are drivingly connected together via the input shaft I. In a disengaged state of the first clutch C1, the engine E and the rotating electrical machine MG are disconnected from each other.

The rotating electrical machine MG has a stator 21 and the rotor 22 (see FIG. 2), and is capable of functioning as a motor (an electric motor) that is supplied with electric power and generates motive power, and as a generator (an electric generator) that is supplied with motive power and generates electric power. Thus, the rotating electrical machine MG is electrically connected to an electricity accumulating device, not shown. In the present example, a battery is used as the electricity accumulating device. Note that it is also preferable to use a capacitor or the like as the electricity accumulating device. The rotating electrical machine MG is powered by receiving electric power from the battery, or supplies electric power, which is generated by a driving force transferred from the wheels W, to the battery to accumulate the electric power in the battery. The rotor 22 of the rotating electrical machine MG is drivingly connected to a pump impeller 31 of the torque converter TC so as to rotate together with the pump impeller 31.

The torque converter TC is a device for converting torque of one or both of the engine E and the rotating electrical machine MG and transferring the converted torque to the transmission device TM. The torque converter TC includes: the pump impeller 31 drivingly connected to the rotor 22 of the rotating electrical machine MG so as to rotate together with the rotor 22; a turbine runner 41 drivingly connected to an intermediate shaft M so as to rotate together with the intermediate shaft M; and a stator 46 provided between the pump impeller 31 and the turbine runner 41. The torque converter TC is capable of transferring torque between the pump impeller 31 as a driving member, and the turbine runner 41 as a driven member, via oil contained in the torque converter TC. In the present embodiment, the pump impeller 31 corresponds to a "driving rotating member" in the present invention, and the turbine runner 41 corresponds to a "driven rotating member" in the present invention. The oil contained in the torque converter TC corresponds to "fluid" in the present invention.

The torque converter TC includes a second clutch C2. The second clutch C2 functions as a friction engagement device for locking up the torque converter TC. In order to eliminate the difference in rotational speed between the pump impeller 31 and the turbine runner 41 to increase power transfer efficiency, the second clutch C2 drivingly connects the pump impeller 31 and the turbine runner 41 so that the pump impeller 31 and the turbine runner 41 rotate together. That is, in an engaged state of the second clutch C2, the torque converter TC transfers torque of one or both of the engine E and the rotating electrical machine TM directly to the transmission device TM via the intermediate shaft M without using the oil contained in the torque converter TC.

The transmission device TM is a device for shifting the rotational speed of the intermediate shaft M at a predetermined speed ratio, and transmitting the resultant rotational speed to the output shaft O. An automatic or manual multi-stage transmission device that has a plurality of shift speeds of different speed ratios in a switchable manner, an automatic continuously variable transmission device capable of continuously changing the speed ratio, or the like can be used as the transmission device TM. The transmission device TM shifts the rotational speed of the intermediate shaft M and converts torque at a predetermined speed ratio at each time, and transfers the converted torque to the output shaft O. The torque transferred from the transmission device TM to the output shaft O is distributed and transferred to two (right and left) wheels W via a differential unit D. Note that the present embodiment has a uniaxial structure in which the input shaft I, the intermediate shaft M, and the output shaft O are arranged coaxially.

1-2. Structure of Each Part of Hybrid Drive Device

The structure of each part of the hybrid drive device 1 according to the present embodiment will be described with reference to FIGS. 2 to 4. As described above, the hybrid drive device 1 includes the input shaft I, the intermediate shaft M, the output shaft O, the rotating electrical machine MG, the torque converter TC, the transmission device TM, and the first clutch C1. In the present embodiment, the first clutch C1 is positioned radially inside the rotating electrical machine MG, and the rotating electrical machine MG and the first clutch C1, the torque converter TC, and the transmission device TM are axially arranged in this order from the engine E side. The input shaft I, the intermediate shaft M, and the output shaft O are axially arranged in this order from the engine E side. These parts are accommodated in the case 2 that is a non-rotating member. The structure of each part of the hybrid drive device 1 will be described in detail below.

1-2-1. Drive Device Case

As shown in FIG. 2, the case 2 includes a case peripheral wall 3 that surrounds the outer periphery of each part accommodated in the case 2, and the end support wall 4 that closes the opening at one axial end (the left end in FIG. 2; hereinafter "one axial side" means the left side) of the case peripheral wall 3. The case 2 further includes an intermediate support wall 6 that is positioned axially between the torque converter TC and the transmission device TM. In the present embodiment, the case 2 is structured so as to be dividable into a first case 2*a*, and a second case 2*b* that is attached to the other axial side (the right side in FIG. 2; hereinafter the "other axial side" means the right side) of the first case 2*a*. The first case 2*a* has a case peripheral wall 3*a*, and the end support wall 4 is formed integrally with the case peripheral wall 3*a*. The second case 2*b* has a case peripheral wall 3*b*, and the intermediate support wall 6 is provided on the case peripheral wall 3*b*. The rotating electrical machine MG, the torque converter TC, and the first clutch C1 are accommodated in a space defined by the case peripheral wall 3*a*, the end support wall 4, and the intermediate support wall 6 in the case 2. Although not shown in FIG. 2, the transmission device TM is accommodated in a space surrounded by the case peripheral wall 3*b* that is located on the side opposite to the end support wall 4 with respect to the intermediate support wall 6 in the case 2.

The end support wall 4 is shaped so as to extend at least radially. In the present embodiment, the end support wall 4 extends radially and circumferentially. In the present example, the end support wall 4 is a substantially flat, disc-shaped wall. An axial through hole is formed in a radial central portion of the end support wall 4, and the input shaft I, which is inserted through the through hole, extends through the end support wall 4 into the case 2. The end support wall 4 has the cylindrical (boss-shaped) axially protruding portion 5 around the input shaft I, and the axially protruding portion 5 protrudes toward the other axial side (toward the rotating electrical machine MG, namely into the internal space of the case 2). The axially protruding portion 5 is formed integrally with the end support wall 4. Supply oil passages L1, L2 for supplying oil to the first clutch C1 are formed inside the end support wall 4 and the axially protruding portion 5 (see FIGS. 3 and 4). A discharge oil passage L3 for discharging the oil supplied to the first clutch C1 is formed in the end support wall 4 and the axially protruding portion 5 (see FIG. 3). In the present embodiment, the end support wall 4 corresponds to a "support wall" in the present invention.

The intermediate support wall 6 is shaped so as to extend at least radially, and in the present embodiment, the intermediate support wall 6 extends radially and circumferentially. In the present example, the intermediate support wall 6 is a substantially flat, disc-shaped wall. The intermediate support wall 6 is fixedly fastened to the case peripheral wall 3*b* by a fastening member such as bolts. A pump cover 7 is fixedly fastened to the intermediate support wall 6 by a fastening member such as bolts such that the pump cover 7 is in contact with one axial side of the intermediate support wall 6. A pump chamber is formed between the intermediate support wall 6 and the pump cover 7, and an oil pump 9 is positioned in the pump chamber. An axial through hole is formed in a radial central portion of the intermediate support wall 6 and the pump cover 7, and the intermediate shaft M, which is inserted through the through hole, extends through the intermediate support wall 6 and the pump cover 7. The pump cover 7 has a cylindrical (boss-shaped) axially protruding portion 8 around the intermediate shaft M, and the axially protruding portion 8 protrudes toward one axial side (toward the torque converter TC). The axially protruding portion 8 is formed integrally with the pump cover 7.

In the present embodiment, the oil pump 9 is an internal gear pump having an inner rotor and an outer rotor. The oil pump 9 is positioned coaxially with the input shaft I and the intermediate shaft M. As described below, the inner rotor has its radial central portion connected to the pump impeller 31 of the torque converter TC so that the inner rotor rotates together with the pump impeller 31. As the pump impeller 31 rotates, the oil pump 9 discharges oil (working fluid) and generates an oil pressure for supplying oil to the transmission device TM, the first clutch C1, the torque converter TC, and the like. Note that oil passages are formed inside the end support wall 4, the intermediate support wall 6, the pump cover 7, the intermediate shaft M, and the like, so that the oil discharged from the oil pump 9 flows through a hydraulic control device (not shown) and these oil passages, and is supplied to each part to be supplied with the oil pressure.

1-2-2. Input Shaft, Intermediate Shaft

The input shaft I is a shaft for applying a driving force of the engine E to the hybrid drive device 1, and as shown in FIG. 2, has its one axial end connected to the engine E. The input shaft I is connected to the engine output shaft of the engine E so as to rotate together with the engine output shaft. A damper or the like may be inserted between the input shaft I and the engine output shaft. The input shaft I is provided so as to extend through the case 2. As described above, the axial through hole is formed in the radial central portion of the end support wall 4 that forms a part of the case 2, and the input shaft I is inserted through the end support wall 4 into the case 2 via this through hole. Specifically, the input shaft I is positioned so as to axially extend through the entire length of the cylindrical axial protruding portion 5 of the end support wall 4. The input shaft I is rotatably supported by the axially protruding portion 5 of the end support wall 4 via a needle bearing 72a.

The intermediate shaft M is a shaft for applying the output torque of the torque converter TC to the transmission device TM, and as shown in FIG. 2, has its one axial end connected to the turbine runner 41 of the torque converter TC so that the intermediate shaft M rotates together with the turbine runner 41. The intermediate shaft M is provided so as to extend through the intermediate support wall 6 and the pump cover 7. As described above, the axial through hole is formed in the radial central portion of the intermediate support wall 6 and the pump cover 7, and the intermediate shaft M extends through the intermediate support wall 6 and the pump cover 7 via the through hole. Specifically, the intermediate shaft M is positioned so as to axially extend through the entire length of the through hole formed in the intermediate support wall 6 and the entire length of the cylindrical axially protruding portion 8 of the pump cover 7. The intermediate shaft M is rotatably supported by the intermediate support wall 6 via a fixed sleeve 49.

1-2-3. Rotating Electrical Machine

As shown in FIG. 2, the rotating electrical machine MG is positioned adjacent to the end support wall 4 of the case 2 on the other axial side of the end support wall 4. The first clutch C1 is also positioned adjacent to the end support wall 4 of the case 2 on the other axial side of the end support wall 4, and the rotating electrical machine MG is positioned radially outside the first clutch C1. Although not shown in the drawing, the stator 21 of the rotating electrical machine MG is fixed to the case 2. The rotor 22 is rotatably supported by the case 2. Note that the rotating electrical machine MG is positioned coaxially with the input shaft I and the intermediate shaft M, and the rotation central axis X of the rotor 22 matches the rotation central axes of the input shaft I and the intermediate shaft M. The rotor 22 is connected to the pump impeller 31 of the torque inverter TC via the rotor support member 23 so as to rotate together with the pump impeller 31.

As shown in FIGS. 3 and 4, the rotor support member 23 is a member that extends at least radially to support the rotor 22. In the present embodiment, the rotor support member 23 is a disc-shaped member that is provided so as to extend radially inward from the rotor 22, and has a circular hole in its radial central portion. In the present example, in order to support the inner peripheral surface of the rotor 22, the rotor support member 23 is shaped so as to integrally include a cylindrical portion 24 that is cylindrically shaped and protrudes from the disc-shaped member toward the other axial side. The inner peripheral surface of the rotor 22 is in contact with, and is fixed to the outer peripheral surface portion of the cylindrical portion 24. An internal spline engagement groove 24a is formed in the entire circumference of an inner peripheral surface portion of the cylindrical portion 24. The internal spline engagement groove 24a engages with an external spline engagement groove 53b that is formed in an outer peripheral surface portion of a first clutch drum 53 described below.

The rotor support member 23 is shaped so as to integrally include an axially protruding portion 25 that is cylindrically shaped (boss shaped) and protrudes from the disc-shaped member toward one axial side (toward the case 2) in order to support the rotor support member 23 and the rotor 22 by the case 2. The support bearing 71 is provided so as to support the inner peripheral surface of the axially protruding portion 25. Thus, the rotor support member 23, and the rotor 22 supported by the rotor support member 23 are rotatably supported by the case 2 via the support bearing 71. In the present embodiment, the rotor support member 23 includes a cylindrical protruding portion 26 that is cylindrically shaped (boss shaped) and protrudes toward the other axial side (toward the torque converter TC). In the present example, the axially protruding portion 25 and the cylindrical protruding portion 26 are formed integrally with the rotor support member 23 at a radial inner end of the rotor support member 23. In the present embodiment, the cylindrical protruding portion 26 of the rotor support member 23 corresponds to a "first cylindrical protruding portion" in the present invention.

In the present embodiment, a rotation sensor 27 is provided axially between the end support wall 4 of the case 2 and the rotor support member 23 at a position adjacent to the rotor support member 23. The rotation sensor 27 is positioned radially outside the axially protruding portion 25 of the rotor support member 23. A sensor stator 27a of the rotation sensor 27 is fixed to the end support wall 4 of the case 2, and a sensor rotor 27b of the rotation sensor 27 is fixed to the axially protruding portion 25 of the support member 23. A resolver or the like can be used as the rotation sensor 27.

1-2-4. First Clutch

As shown in FIG. 2, the first clutch C1 is positioned near the end support wall 4 of the case 2 on the other axial side of the end support wall 4. Note that the rotor support member 23 of the rotating electrical machine MG is also positioned adjacent to the end support wall 4 of the case 2 on the other axial side of the end support wall 4, and the first clutch C1 is positioned closer to the other axial side than the rotor support member 23. That is, the first clutch C1 is positioned closer to the torque converter TC that is located on the side opposite to the end support wall 4 with respect to the rotor support member 23. Moreover, the first clutch C1 is positioned in a space formed radially inside the cylindrical portion 24 and located on the other axial side of the rotor support member 23. That is, the first clutch C1 is positioned radially inside the rotor 22 so as to axially overlap the rotor 22. In the present example, the first clutch C1 is positioned so as to be entirely accommodated in the space mentioned above, and is positioned so that the entire axial length of the first clutch C1 overlaps the rotor 22.

The first clutch C1 is a friction engagement device that drivingly connects the engine E and the rotating electrical machine MG selectively as described above. In order to implement this function, as shown in FIGS. 3 and 4, the first clutch C1 includes: a first clutch hub 52 connected to the input shaft I so as to rotate together with the input shaft I; the first clutch drum 53 connected to the pump impeller 31 of the torque converter TC and the rotating electrical machine MG so as to rotate together with the pump impeller 31 and the rotating electrical machine MG; and a first piston 54. The first piston 54 is biased toward one axial side by a first return spring 55. The first clutch C1 includes a plurality of outer friction plates 56a whose rotation relative to the first clutch drum 53 is restricted and which are held so as to be axially slidable, and a plurality of inner friction plates 56b whose rotation relative to the first clutch hub 52 is restricted and which are held so as to be axially slidable. A fluid-tight first supply oil chamber H1 is formed between the first clutch drum 53 and the first piston 54, and oil having a predetermined oil pressure controlled by the hydraulic control device is supplied to the first supply oil chamber H1 through the second supply oil passage L2 described below (see FIG. 4). If the oil pressure in the first supply oil chamber H1 increases and exceeds the biasing force of the first return spring 55, the first piston 54 moves in such a direction that increases the capacity of the first supply oil chamber H1 (in the present example, toward the other axial side), and engages the outer friction plates 56a with the inner friction plates 56b. As a result, the driving force from the engine E is transferred to the rotating electrical machine MG and the pump impeller 31 via the first clutch C1. Note that, in the present embodiment, the first supply oil chamber H1 corresponds to a "supply oil chamber" in the present invention, and the outer friction plates 56a and the inner friction plates 56b correspond to "friction materials."

In the present embodiment, the first clutch drum 53 of the first clutch C1 is connected to a front cover 32 of the pump impeller 31 so as to rotate together with the front cover 32. In the present example, the first clutch drum 53 and the front cover 32 are integrally fixed together by welding. The first clutch drum 53 has a cylindrical portion 53a, and the external spline engagement groove 53b is formed in the entire circumference of the outer peripheral surface portion of the cylindrical portion 53a. The external spline engagement groove 53b engages with the internal spline engagement groove 24a that is formed in the inner peripheral surface portion of the rotor support member 23 described above. In the present embodiment, the first clutch drum 53 of the first clutch C1 is structured so as to accommodate the remaining members of the first clutch C1, such as the first clutch hub 52, the first piston 54, and the friction plates 56a, 56b, between the first clutch drum 53 and the front cover 32 integrally fixed to the first clutch drum 53. In the present embodiment, the first clutch C1 is located on one axial side of the front cover 32, and is positioned outside a space surrounded by the front cover 32 and a rear cover 33 (see FIG. 2) of the torque converter TC. The first clutch drum 53 is positioned in contact with the cylindrical protruding portion 26 of the rotor support member 23. In the present embodiment, the first clutch drum 53 has a cylindrical protruding portion 53c that is cylindrically shaped (boss shaped) and protrudes toward one axial side (toward the rotor support member 23). In the present example, the cylindrical protruding portion 53c is formed integrally with the first clutch drum 53 at a radial inner end of the first clutch drum 53. Note that, in the present embodiment, the cylindrical protruding portion 53c of the first clutch drum 53 corresponds to a "second cylindrical protruding portion" in the present invention, and the first clutch drum 53 corresponds to an "accommodating member" in the present invention.

1-2-5. Torque Converter

As shown in FIG. 2, the torque converter TC is positioned on the other axial side of the rotating electrical machine MG. In the present embodiment, since the first clutch C1 is positioned radially inside the rotating electrical machine MG, the torque converter TC is positioned on the other axial side of the rotating electrical machine MG and the first clutch C1.

The pump impeller 31 of the torque converter TC includes the front cover 32, the rear cover 33, blades 34, and a pump hub 35. The front cover 32 is a cylindrical member formed so as to cover one axial side of the torque converter TC, and in the present example, is a stepped cylindrical member having a stepped portion in its radial central portion. A portion on one axial side of the front cover 32 is a smaller diameter cylindrical portion 32a, and a portion on the other axial side thereof is a larger diameter cylindrical portion 32b. One axial end of the smaller diameter cylindrical portion 32a of the front cover 32 is positioned radially inside the rotor 22 of the rotating electrical machine MG so as to axially overlap the rotor 22. The smaller diameter cylindrical portion 32a of the front cover 32 is integrally fixed to the first clutch drum 53. Thus, the front cover 32 is connected to the first clutch drum 53 and the rotor 22 so as to rotate together with the first clutch drum 53 and the rotor 22. As described in detail below, in the present embodiment, the torque converter TC is structured so as to be supported by a hydraulic transmission device support member 30 including the front cover 32 and the first clutch drum 53 which are integrally fixed together. Note that as described above, in the present embodiment, since the first clutch drum 53 functions as the "accommodating member" in the present invention, the hydraulic transmission device support member 30 including the front cover 32 and the first clutch drum 53 forms a part of the "accommodating member" in the present invention.

The rear cover 33 is a ring-shaped member, which is formed so as to cover the other axial side of the pump impeller 31 and the torque converter TC, has a circular hole in its radial central portion, and has a circular arc-shaped cross-section that protrudes toward the other axial side. The rear cover 33 is connected to the front cover 32 so as to rotate together with the front cover 32. A multiplicity of blades 34 are formed in the rear cover 33. The pump hub 35 is connected to a radial inner end of the rear cover 33 so as to rotate together with the rear cover 33. The pump hub 35 is rotatably supported by the pump cover 7 via a needle bearing 72b. Note that the pump cover 7 is fixedly fastened to the intermediate support wall 6 that forms a part of the case 2. The other axial end of the pump hub 35 is connected to the inner rotor of the oil pump 9 so as to rotate together with the inner rotor of the oil pump 9.

The turbine runner 41 of the torque converter TC includes a turbine cover 42, blades 43, and a turbine hub 44. The turbine cover 42 is a ring-shaped member, which is positioned axially between the front cover 32 and the rear cover 33, has a circular hole in its radial central portion, and has a circular arc-shaped cross-section that protrudes toward one axial side. A multiplicity of blades 43 are formed in the turbine cover 42. The multiplicity of blades 43 of the turbine runner 41 are positioned so as to axially face the multiplicity of blades 34 of the pump impeller 31 with a predetermined gap therebetween. A radial inner end of the turbine cover 42 is connected to the turbine hub 44 via a connection member 45, such as rivets, so that the turbine cover 42 rotates together with the turbine hub 44. The intermediate shaft M is connected to a radial inner end of the turbine hub 44 by spline engagement so as to rotate together with the turbine hub 44.

The stator 46 of the torque converter TC includes blades 47, a one-way clutch 48, and the fixed sleeve 49. The stator 46 is provided with a multiplicity of blades 47, and these blades 47 are positioned axially between the blades 34 of the pump impeller 31 and the blades 43 of the turbine runner 41. The blades 47 are connected to the fixed sleeve 39 via the one-way clutch 48 such that only rotation in one circumferential direction is allowed, and rotation in the other circumferential direction is restricted. The fixed sleeve 49 is fixed to the intermediate support wall 6 such that the outer peripheral surface of the other axial end of the fixed sleeve 49 is in contact with the inner peripheral surface of the through hole formed in the radial central portion of the intermediate support wall 6. Note that the pump impeller 31, the turbine runner 41, and the stator 46 form an annular torque converter unit. Thus, the pump impeller 31, the turbine runner 41, and the stator 46 are hereinafter sometimes collectively referred to as an "annular portion."

As shown in FIG. 2, the second clutch C2, which functions as a friction engagement device for locking up the torque converter TC, is positioned in a space formed between the front cover 32 and the rear cover 33, and is located closer to one axial side than the annular portion. In the present embodiment, the second clutch C2 is positioned so as to be accommodated in the smaller diameter cylindrical portion 32a of the front cover 32, and the annular portion is positioned so as to be accommodated in the larger diameter cylindrical portion 32*b* of the front cover 32. In the present embodiment, the second clutch C2 is positioned axially adjacent to the first clutch C1 with the front cover 32 interposed therebetween.

The second clutch C2 is a friction engagement element for drivingly connecting the pump impeller 31 and the turbine runner 41 of the torque converter TC selectively. In order to implement this function, as shown in FIGS. 3 and 4, the second clutch C2 includes: a second clutch drum 62 connected to the turbine hub 44 of the turbine runner 41 so as to rotate together with the turbine hub 44; a second clutch support member 61 that cooperates with the front cover 32 of the pump impeller 31 to function as a second clutch hub; and a second piston 64. The second piston 64 is biased toward one axial side by a second return spring 65. The second clutch C2 further includes: a plurality of outer friction plates 66*a* whose rotation relative to the second clutch drum 62 is restricted and which is held so as to be axially slidable; and a plurality of inner friction plates 66*b* whose rotation relative to the second clutch support member 61 is restricted and which is held so as to be axially slidable. A fluid-tight second supply oil chamber H2 is formed between the second clutch support member 61 and the front cover 32, and the second piston 64, and oil having a predetermined oil pressure controlled by the hydraulic control device is supplied to the second supply oil chamber H2 through a second central axis oil passage Lc2 formed in the intermediate shaft M. If the oil pressure in the second supply oil chamber H2 increases and exceeds the biasing force of the second return spring 65, the second piston 64 moves in such a direction that increases the capacity of the second supply oil chamber H2 (in the present example, toward the other axial side), and engages the outer friction plates 66*a* with the inner friction plates 66*b*. As a result, the driving force of one or both of the engine E and the rotating electrical machine MG is directly transferred to the intermediate shaft M via the second clutch C2.

According to the structure of each part and the connection structure between the parts in the present embodiment described above, the parts of the hybrid drive device 1 are sequentially positioned in the following order from one axial side (from the engine E side): the end support wall 4 of the case 2, the rotor support member 23, the first clutch C1, the second clutch C2, the annular portion of the torque converter TC, the oil pump 9, and the intermediate support wall 6 of the case 2.

1-3. Support Structures of Rotor and Torque Converter

The support structures of the rotor 22 of the rotating electrical machine MG and the torque converter TC, which are a first main part of the present invention, will be described below. The support structure of the rotor 22 of the rotating electrical machine MG and the support structure of the torque converter TC will be described in this order.

1-3-1. Support Structure of Rotor

First, the support structure of the rotor 22 will be described. As described above, the rotor support member 23 is shaped so as to integrally include the cylindrical axially protruding portion 25, and the support bearing 71 is provided so as to support the inner peripheral surface of the axially protruding portion 25. As shown in FIGS. 3 and 4, the rotor support member 23 and the rotor 22 supported by the rotor support member 23 are rotatably supported radially inside the rotor 22 by the outer peripheral surface 5*b* of the axially protruding portion 5 of the end support wall 4, which forms a part of the case 2, via the support bearing 71. In the present embodiment, a ball bearing, which is a kind of radial bearing, is used as the support bearing 71. The ball bearing is capable of supporting a relatively large radial load. That is, the rotor support member 23 and the rotor 22 supported by the rotor support member 23 are rotatably supported radially on the outer peripheral surface 5*b* of the axially protruding portion 5 via the support bearing 71.

In the present embodiment, the rotor support member 23 and the rotor 22 supported by the rotor support member 23 are also supported axially via the support bearing 71. The axially protruding portion 5 has an axial stepped portion 11 in its outer peripheral surface 5*b*, and a part of the axially protruding portion 5, which is located on the other axial side of the stepped portion 11, has a smaller diameter than that of a part of the axially protruding portion 5, which is located on one axial side of the stepped portion 11. The support bearing 71 is provided in contact with the other axial side of the stepped portion 11 of the axially protruding portion 5. A snap ring 81 is provided in contact with the other axial end face of the support bearing 71. The snap ring 81 is fixedly fitted in a groove formed in the outer peripheral surface 5*b* of the axially protruding portion 5. The snap ring 81 functions as a restricting member that cooperates with the stepped portion 11 of the axially protruding portion 5 to restrict axial movement of the support bearing 71. Thus, the support bearing 71 is axially fixed to the axially protruding portion 5.

On the other hand, the rotor support member 23 has the cylindrical axially protruding portion 25 and the cylindrical protruding portion 26 at its radial inner end. The inner diameter of the cylindrical protruding portion 26 is slightly smaller than that of the axially protruding portion 25, whereby a radial stepped portion 26*a* is formed between the axially protruding portion 25 and the cylindrical protruding portion 26 of the rotor support member 23. The support bearing 71 is provided in contact with one axial side of the stepped portion 26*a*. A snap ring 82 is provided in contact with one axial end face of the support bearing 71. The snap ring 82 is fixedly fitted in a groove formed in the inner peripheral surface of the axially protruding portion 25 of the rotor support member 23. The snap ring 82 functions as a restricting member that cooperates with the stepped portion 26*a* of the rotor support member 23 to restrict axial movement of the support bearing 71. Thus, the support bearing 71 is axially fixed to the rotor support member 23. As a result, the support bearing 71 is axially fixed to both the axially protruding portion 5 and the rotor support member 23, and the rotor support member 23 and the rotor 22 supported by the rotor support member 23 are axially supported by the axially protruding portion 5 via the support bearing 71. Thus, the rotor support member 23 and the rotor 22 supported by the rotor support member 23 are radially and axially supported so as to be rotatable with respect to the axially protruding portion 5 via the support bearing 71 provided on the outer peripheral surface 5*b* of the axially protruding portion 5.

According to the support structure of the rotor 22 of the present embodiment, the rotor support member 23 and the rotor 22 supported by the rotor support member 23 are supported so as to be rotatable with respect to the axially protruding portion 5 that forms a part of the case 2 as a non-rotating member. Thus, high accuracy of the central axis of the rotor 2 is easily ensured. In the present embodiment, the rotor support member 23 and the rotor 22 supported by the rotor support member 23 are supported radially inside the rotor 22 by the axially protruding portion 5. Thus, a support path for the rotor 22 is very short, and high accuracy of the central axis of the rotor 22 is easily ensured in this regard as well.

1-3-2. Support Structure of Torque Converter

Next, the support structure of the torque converter TC will be described. In the present embodiment, the torque converter TC is supported by the hydraulic transmission device support member 30. The hydraulic transmission device support member 30 includes at least the front cover 32, the rear cover 33, and the pump hub 35, and in the present embodiment, further includes the first clutch drum 53 integrally fixed to the front cover 32. As shown in FIG. 2, on the other axial side (on the intermediate support wall 6 side), the hydraulic transmission device support member 30 and the torque converter TC supported by the hydraulic transmission device support member 30 are radially supported so as to be rotatable with respect to the axially protruding portion 8 of the pump cover 7 via the needle bearing 72b.

In the present embodiment, on one axial side (on the end support wall 4 side), the hydraulic transmission device support member 30 and the torque converter TC supported by the hydraulic transmission device support member 30 are supported integrally with the rotor 22 of the rotating electrical machine MG. That is, the hydraulic transmission device support member 30 is connected to the rotor support member 23, and is supported on the outer peripheral surface 5b of the axially protruding portion 5 via the rotor support member 23. As described above, the internal spline engagement groove 24a is formed in the inner peripheral surface portion of the cylindrical portion 24 of the rotor support member 23. The rotor support member 23 further has the cylindrical protruding portion 26 that protrudes toward the other axial side (toward the torque converter TC). On the other hand, the external spline engagement groove 53b is formed in the outer peripheral surface portion of the cylindrical portion 53a of the first clutch drum 53 that forms a part of the hydraulic transmission device support member 30. The first clutch drum 53 further has the cylindrical protruding portion 53c that protrudes toward one axial side (toward the rotor support member 23).

The internal spline engagement groove 24a of the rotor support member 23 engages with the external spline engagement groove 53b of the first clutch drum 53, and at the same time the cylindrical protruding portion 26 of the rotor support member 23 fits on the cylindrical protruding portion 53c of the first clutch drum 53. In the present example, the inner peripheral surface of the cylindrical protruding portion 26 fits on the outer peripheral surface of the cylindrical protruding portion 53c. Engaging the internal spline engagement groove 24a with the external spline engagement groove 53b can facilitate circumferential positioning of the rotor support member 23 and the hydraulic transmission device support member 30, whereby the structure in which the rotor support member 23 and the hydraulic transmission device support member 30 rotate together can be appropriately implemented. Fitting the cylindrical protruding portion 26 on the cylindrical protruding portion 53c can appropriately restrict radial relative movement between the rotor support member 23 and the hydraulic transmission device support member 30, and can facilitate radial positioning of the rotor support member 23 and the hydraulic transmission device support member 30. In the present embodiment, the portion where the internal spline engagement groove 24 engages with the external spline engagement groove 53 is located radially outside the portion where the cylindrical protruding portion 26 fits on the cylindrical protruding portion 53c. This increases the resistance of the spline engagement portion to the torque load, and suppresses an increase in diameter of the fitting portion, whereby processing accuracy and accuracy of the central axis of the fitting portion can be increased.

In the present embodiment, the other axial end face (the end face located on the torque converter TC side) of the cylindrical protruding portion 26 of the rotor support member 23 is in contact with a radial wall 53d of the first clutch drum 53 that forms a part of the hydraulic transmission device support member 30. Thus, the hydraulic transmission device support member 30 is axially supported by the rotor support member 23. In this manner, the hydraulic transmission device support member 30 is connected to the rotor support member 23, and is axially supported by the rotor support member 23. As described above, the rotor support member 23 is radially and axially supported so as to be rotatable with respect to the axially protruding portion 5 via the support bearing 71 provided on the outer peripheral surface 5b of the axially protruding portion 5. Accordingly, in the present embodiment, on one axial side (the end support wall 4 side), the hydraulic transmission device support member 30 and the torque converter TC supported by the hydraulic transmission device support member 30 are radially and axially supported so as to be rotatable with respect to the axially protruding portion 5 via the rotor support member 23 and the support bearing 71 provided on the outer peripheral surface 5b of the axially protruding portion 5. Since the present embodiment uses this support structure, high accuracy of the central axis of the torque converter TC can be easily ensured.

In the present embodiment, the first clutch drum 53 and the front cover 32, which form a part of the hydraulic transmission device support member 30 and are integrally fixed together, are connected to the rotor support member 23, and are radially and axially supported by the rotor support member 23 and the support bearing 71. The pump impeller 31, the turbine runner 41, and the stator 46, which form the annular portion of the torque converter TC, are axially supported via thrust bearings 73b, 73c, and 73d. The thrust bearing 73b is provided between the second clutch support member 61 and the turbine hub 44, which are connected to the radial central portion of the front cover 32. The thrust baring 73c is provided between the turbine hub 44 and the one-way clutch 48. The thrust bearing 73d is provided between the one-way clutch 48 and the pump hub 35. Thus, the entire torque converter TC is axially supported on the axially protruding portion 5, which forms a part of the case 2, by the support bearing 71 via the front cover 32, the first clutch drum 53, and the rotor support member 23. Note that the input shaft I is axially supported via thrust bearings 73a and 73e. The thrust bearing 73a is provided between the second clutch support member 61 and the other axial end face of the input shaft I, and the thrust bearing 73e is provided between the first clutch drum 53 and the first clutch hub 52.

1-4. Structure of Oil Passages in Case

The structure of oil passages in the case 2, which is a second main part of the present invention, will be described below mainly with respect to the structure of oil passages formed inside the end support wall 4 and the axially protruding portion 5. In the present embodiment, three oil passages, namely the first supply oil passage L1, the second supply oil passage L2, and the discharge oil passage L3, are formed inside the end support wall 4 and the axially protruding portion 5. Note that the first supply oil passage L1 and the second supply oil passage L2 are oil passages of different routes for supplying oil to the first clutch C1. The discharge oil passage L3 is an oil passage for discharging the oil supplied to the first clutch C1. As shown in FIG. 5, these oil passages are formed at different circumferential positions in the end support wall 4 and the axial protruding portion 5. Note that the upper halves of FIGS. 3 and 4 show cross-sectional views at different circumferential positions, and the lower halves thereof show cross-sectional views at the same circumferential position.

The first supply oil passage L1 extends radially in the end support wall 4 and axially in the axially protruding portion 5. As shown in FIGS. 3 and 5, the first supply oil passage L1 has the first opening 12 that is formed in the end face 5a located on the other axial side of the axially protruding portion 5, namely in the protruding direction of the axially protruding portion 5. As described above, in the present embodiment, the hydraulic transmission device support member 30 and the torque converter TC supported by the hydraulic transmission device support member 30 are radially and axially supported so as to be rotatable with respect to the axially protruding portion 5 via the rotor support member 23 and the support bearing 71 provided on the outer peripheral surface 5b of the axially protruding portion 5. The entire torque converter TC is axially supported on the axially protruding portion 5 by the support bearing 71 via the front cover 32, the first clutch drum 53, and the rotor support member 23. In the present embodiment, the use of this support structure of the torque converter TC can eliminate the need to provide a thrust bearing that normally needs to be provided between the axial end face 5a of the axially protruding portion 5 and a disc portion 52a of the first clutch hub 52 (shown by thick dashed line in FIG. 4). The first opening 12 is provided in the axial end face 5a of the axially protruding portion 5, which is open without being blocked by such a thrust bearing. Note that in the present embodiment, the first supply oil passage L1 corresponds to a "supply oil passage" in the present invention, and the first opening 12 corresponds to an "end face opening" in the present invention.

The first supply oil passage L1 is a supply passage for oil to be supplied to the outer friction plates 56a and the inner friction plates 56b of the first clutch C1. After being supplied through the first supply oil passage L1 and flowing out of the first opening 12, the oil flows in the space formed between the first piston 54 and the first clutch hub 52, and is supplied to the outer friction plates 56a and the inner friction plates 56b to cool the outer friction plates 56a and the inner friction plates 56b. At this time, this oil also lubricates and cools the thrust bearing 73e provided between the first clutch drum 53 and the first clutch hub 52. After flowing through the gap between the outer friction plates 56a and the inner friction plates 56b, the oil flows in the space formed between the first clutch hub 52 and the front cover 32, and flows into a first central axis oil passage Lc1 formed inside the input shaft I. At this time, this oil also lubricates and cools the thrust bearing 73a provided between the second clutch support member 61 and the input shaft I.

The second supply oil passage L2 extends radially in the end support wall 4 and axially in the axially protruding portion 5, and as shown in FIGS. 4 and 5, has a second opening 13 that is formed in the outer peripheral surface 5b of the axially protruding portion 5. A radial oil hole Lh2 is formed in the axially protruding portion 5, and the second opening 13 is the portion where the oil hole Lh2 is formed in the outer peripheral surface 5b of the axially protruding portion 5. The second supply oil passage L2 is a supply passage for oil to be supplied to the first engagement oil chamber H1. After being supplied through the second supply oil passage L2 and flowing out of the second opening 13, the oil is supplied to the first engagement oil chamber H1 through an oil hole 15a formed in a grooved cylindrical member 15 provided radially outside the axially protruding portion 5, and through an oil hole 53e formed in the first clutch drum 53. A seal ring 77 is provided between the grooved cylindrical member 15 and the first clutch drum 53. An O-ring 78 is provided between the first clutch drum 53 and the first piston 54. The seal ring 77 and the O-ring 78 function as sealing members for suppressing oil leakage. This, fluid-tightness of the first engagement oil chamber H1 is appropriately ensured, whereby engagement and disengagement of the first clutch L1 can be controlled appropriately. Note that the seal ring 77 is also provided between the axially protruding portion 5 and the input shaft I.

The discharge oil passage L3 extends radially in the end support wall 4 and axially in the axially protruding portion 5, and as shown in FIGS. 3 to 5, in the present embodiment, has a third opening 14 that is formed in an inner peripheral surface 5c of the axially protruding portion 5. A radial oil hole Lh3 is formed in the axially protruding portion 5, and the third opening 14 is the portion where the oil hole Lh3 is formed in the inner peripheral surface 5c of the axially protruding portion 5. The discharge oil passage L3 communicates with the first central axis oil passage Lc1, which is formed inside the input shaft I, via the third opening 14. The discharge oil passage L3 is a passage for discharging oil after the oil cools the outer friction plates 56a and the inner friction plates 56b, lubricates the thrust bearings 73a, 73e, and the like. The oil discharged through the discharge oil passage L3 is returned to an oil pan, not shown. Note that in the present embodiment, the third opening 14 corresponds to a "discharge opening" in the present invention.

In the present embodiment, the support bearing 71 and the needle bearing 72a are lubricated by oil that axially leaks through the gap of the seal rings 77. Note that oil seals 76a, 76b as sealing member for suppressing oil leakage are provided between the axially protruding portion 5 of the end support wall 4 and the input shaft I, and between the axially protruding portion 5 of the end support wall 4 and the axially protruding portion 25 of the rotor support member 23.

In the present embodiment, as described above, the first supply oil passage L1 has the opening in the other axial end face 5a of the axially protruding portion 5. This can eliminate the need for a space that is required to form a radial oil hole, which communicates with the first supply oil passage L1, in the axially protruding portion 5 as compared to the case where the first supply oil passage L1 and the second supply oil passage L2 are formed so that their openings are axially arranged in the outer peripheral surface 5b of the axially protruding portion 5. Thus, the axial length of the hybrid drive device 1 can be reduced by an amount corresponding to this space. Note that this effect is produced since no thrust bearing need be provided between the axial end face 5a of the axially protruding portion 5 and the disc portion 52a of the first clutch hub 52. This also contributes to reduction in axial length of the hybrid drive device 1.

2. Second Embodiment

A second embodiment of the present invention will be described with reference to the drawings. The present embodiment is also described with respect to an example in which the vehicle drive device of the present invention is applied to the hybrid drive device 1. The overall structure of the hybrid drive device of the present embodiment and the structure of each part thereof are basically similar to those of the first embodiment. In the present embodiment, the support structure of the rotor 22 of the rotating electrical machine MG and the support structure of the torque converter TC are partially different from those of the first embodiment. More specifically, the second embodiment is different from the first embodiment in that the second embodiment uses the structure in which the rotor 22 of the rotating electrical machine MG and the torque converter TC are supported on an inner peripheral surface 5c of the axially protruding portion 5 of the end support wall 4, while the first embodiment uses the structure in which the rotor 22 of the rotating electrical machine MG and the torque converter TC are supported on the outer peripheral surface 5b of the axially protruding portion 5 of the end support wall 4. Thus, the structure of oil passages in the case 2 is partially different from that of the oil passages in the case 2 of the first embodiment. The hybrid drive device 1 of the present embodiment will be described in detail below mainly with respect to the above differences from the first embodiment. Note that the second embodiment is similar to the first embodiment unless otherwise expressly specified.

2-1. First Clutch

Figure 7:
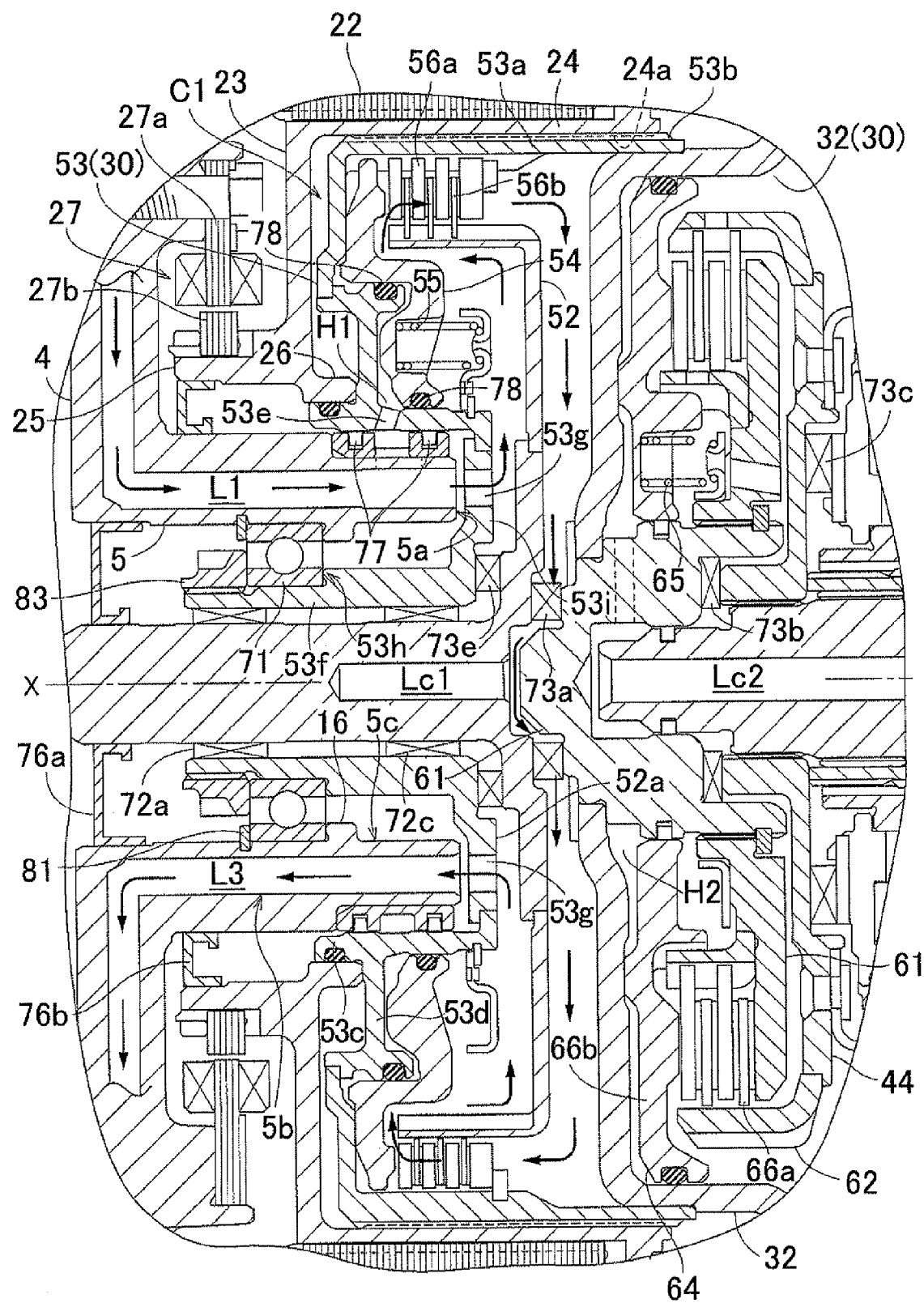
FIG. 7 is a cross-sectional view of a main part of the hybrid drive device according to the second embodiment.
Figure 8:
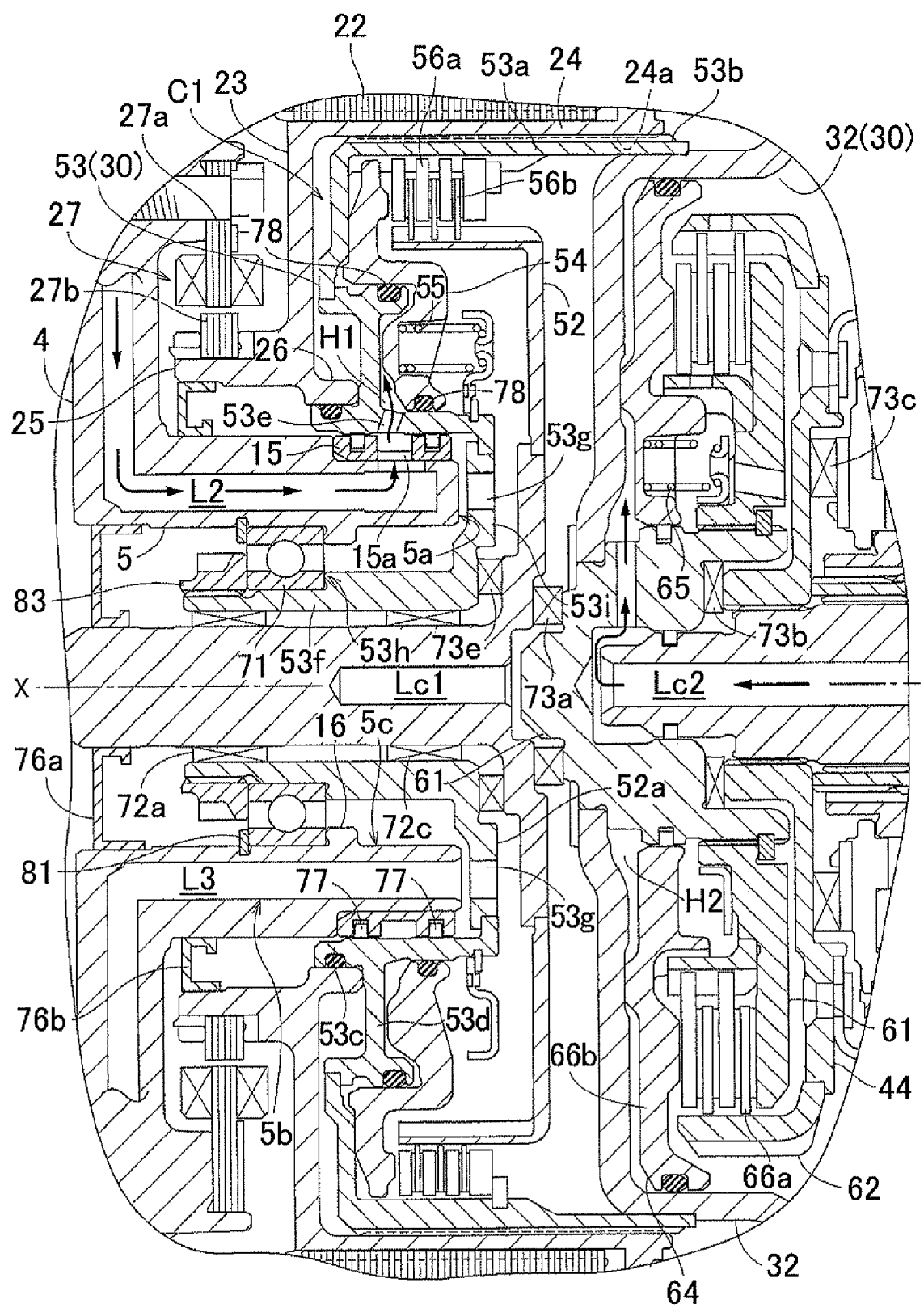
FIG. 8 is a cross-sectional view of the main part of the hybrid drive device according to the second embodiment.

In the present embodiment as well, a first clutch C1 is a friction engagement device that drivingly connects an engine E to the rotating electrical machine MG selectively. In order to implement such a function, as shown in FIGS. 7 and 8, the first clutch C1 includes a first clutch hub 52, a first clutch drum 53, a first piston 54, a first return spring 55, a plurality of outer friction plates 56a, a plurality of inner friction plates 56b, and a fluid-tight first supply oil chamber H1. The structures of these elements are basically similar to those of the first embodiment. However, in the present embodiment, the rotor 22 of the rotating electrical machine MG and the torque converter TC are supported on the inner peripheral surface 5c of the axially protruding portion 5 of the end support wall 4, and thus the first clutch drum 53 is formed so as to cover the axially protruding portion 5 from the other axial side. More specifically, the first clutch drum 53 is shaped so as to have a disc portion 53i positioned on the other axial side of the axially protruding portion 5 and a second cylindrical portion 53f, which is cylindrically shaped and provided at a radial inner end of the disc portion 53i so as to extend toward one axial side. That is, the first clutch drum 53 has a substantially S-shaped radial cross-section. A support bearing 71 is provided so as to support the outer peripheral surface of the second cylindrical portion 53f.

2-2. Support Structure of Torque Converter

In the present embodiment as well, the torque converter TC is supported by a hydraulic transmission device support member 30. The present embodiment is also similar to the first embodiment in that the front cover 32, the rear cover 33, the pump hub 35, and the first clutch drum 53 form the hydraulic transmission device support member 30, and in that, on the other axial side (on the intermediate support member 6 side), the hydraulic transmission device support member 30 is radially supported so as to be rotatable with respect to the axially protruding portion 8 of the pump cover 7 via the needle bearing 72b.

In the present embodiment, on one axial side (on the end support wall 4 side, the hydraulic transmission device support member 30 and the torque converter TC supported by the hydraulic transmission device support member 30 are rotatably supported on the inner peripheral surface 5c of the axially protruding portion 5 of the end support wall 4, which forms a part of the case 2, via the support bearing 71. That is, the first clutch drum 53, which forms a part of the hydraulic transmission device support member 30 and is formed so as to cover the axially protruding portion 5, is supported on the inner peripheral surface 5c of the axially protruding portion 5 not via the rotor support member 23, but only via the support bearing 71 provided between the inner peripheral surface 5c of the axially protruding portion 5 and the outer peripheral surface of the second cylindrical portion 53f. In the present embodiment, a ball bearing, which is a kind of radial bearing, is used as the support bearing 71. The ball bearing is capable of supporting a relatively large radial load. That is, the hydraulic transmission device support member 30 and the torque converter TC supported by the hydraulic transmission device support member 30 are rotatably supported radially on the inner peripheral surface 5c of the axially protruding portion 5 via the support bearing 71.

In the present embodiment, the hydraulic transmission device support member 30 and the torque converter TC supported by the hydraulic transmission device support member 30 are also supported axially via the support bearing 71. The axially protruding portion 5 has a radial protruding portion 16 in its inner peripheral surface 5c. The support bearing 71 is provided in contact with one axial side of the protruding portion 16 of the axially protruding portion 5. A snap ring 81 is provided in contact with one axial end face of the support bearing 71. The snap ring 81 is fixedly fitted in a groove formed in the inner peripheral surface 5c of the axially protruding portion 5. The snap ring 81 functions as a restricting member that cooperates with the protruding portion 16 of the axially protruding portion 5 to restrict axial movement of the support bearing 71. Thus, the support bearing 71 is axially fixed to the axially protruding portion 5.

On the other hand, the second cylindrical portion 53f, which forms a part of the hydraulic transmission device support member 30, has an axial stepped portion 53h in its outer peripheral surface. A portion on one axial side of the stepped portion 53h has a smaller diameter than that of a portion on the other axial side thereof. The support bearing 71 is provided in contact with one axial side of the stepped portion 53h. A latch member 83 is provided in contact with one axial end face of the support bearing 71. The latch member 83 functions as a restricting member that cooperates with the stepped portion 53h of the second cylindrical portion 53f to restrict axial movement of the support bearing 71. Thus, the support bearing 71 is axially fixed to the second cylindrical portion 53f that forms a part of the hydraulic transmission device support member 30. As a result, the support bearing 71 is axially fixed to both the axially protruding portion 5 and the hydraulic transmission device support member 30, and the hydraulic transmission device support member 30 and the torque converter TC supported by the hydraulic transmission device support member 30 are axially supported by the axially protruding portion 5 via the support bearing 71. Thus, the hydraulic transmission device support member 30 and the torque converter TC supported by the hydraulic transmission device support member 30 are radially and axially supported so as to be rotatable with respect to the axially protruding portion 5 via the support bearing 71 provided on the inner peripheral surface 5c of the axially protruding portion 5.

According to the support structure of the torque converter TC of the present embodiment, the torque converter TC is supported so as to be rotatable with respect to the axially protruding portion 5 that forms a part of the case 2 as a non-rotating member. Thus, high accuracy of the central axis of the torque converter TC is easily ensured. Moreover, the first clutch drum 53 and the front cover 32, which form a part of the hydraulic transmission device support member 30 and are integrally fixed together, are supported radially and axially by the support bearing 71. The second embodiment is similar to the first embodiment in that the pump impeller 31, the turbine runner 41, and the stator 46, which form an annular portion of the torque converter TC, are axially supported via the thrust bearings 73b, 73c, and 73d. Thus, the entire torque converter TC is axially supported on the axially protruding portion 5 by the support bearing 71 via the front cover 32 and the first clutch drum 53.

2-3. Support Structure of Rotor

In the present embodiment as well, the rotor 22 is supported by the rotor support member 23. In the present embodiment, the rotor support member 23 and the rotor 22 supported by the rotor support member 23 are supported integrally with the torque converter TC. That is, the rotor support member 23 is connected to the hydraulic transmission device support member 30, and is supported on the inner peripheral surface 5c of the axially protruding portion 5 via the hydraulic transmission device support member 30. Note that the second embodiment is similar to the first embodiment in that the internal spline engagement groove 24a of the rotor support member 23 engages with the external spline engagement groove 53b of the first clutch drum 53, and at the same time the cylindrical protruding portion 26 of the rotor support member 23 fits on the cylindrical protruding portion 53c of the first clutch drum 53, and in that the other axial end face (the end face located on the torque converter TC side) of the cylindrical protruding portion 26 of the rotor support member 23 is in contact with the wall 53d of the first clutch drum 53 that forms a part of the hydraulic transmission device support member 30.

In the present embodiment, the rotor 22 is supported integrally with the hydraulic transmission device support member 30 of the torque converter TC having high accuracy of the central axis, via the rotor support member 23. Thus, high accuracy of the central axis of the rotor 22 can also be easily ensured. In the present embodiment, the rotor support member 23 and the rotor 22 supported by the rotor support member 23 are supported radially inside the rotor 22 by the axially protruding portion 5 only via the disc portion 53i and the second cylindrical portion 53f of the first clutch drum 53. Thus, the support path for the rotor 22 is relatively short, and high accuracy of the central axis of the rotor 22 is relatively easily ensured in this regard as well.

2-4. Structure of Oil Passages in Case

Figure 9:
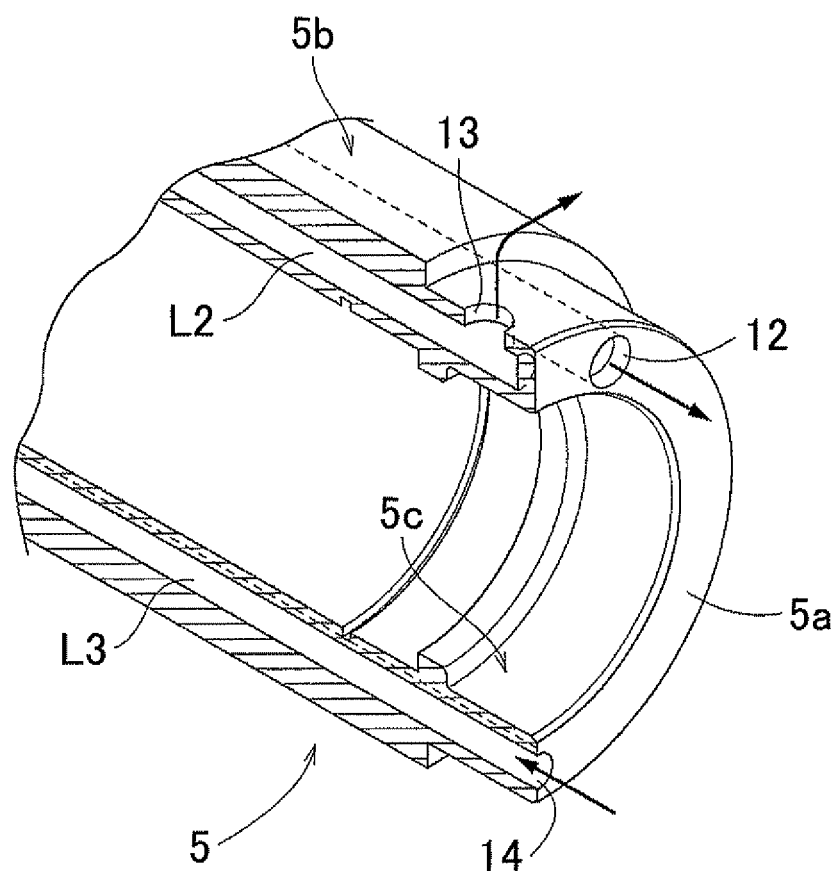
FIG. 9 is a perspective cross-sectional view of oil passages inside a case according to the second embodiment.

In the present embodiment as well, the first supply oil passage L1 extends radially in the end support wall 4, and axially in the axially protruding portion 5, and as shown in FIGS. 7 and 9, has the first opening 12 that is formed in the end face 5a located on the other axial side of the axially protruding portion 5, namely in the protruding direction of the axially protruding portion 5. The second embodiment is also similar to the first embodiment in that the first supply oil passage L1 is a supply passage of oil to be supplied to the outer friction plates 56a and the inner friction plates 56b of the first clutch C1. Note that in the present embodiment, as described above, the first clutch drum 53 is formed so as to cover the axially protruding portion 5 from the other axial side. Thus, an oil hole 53g is formed in the disc portion 53i of the first clutch drum 53 so as to axially extend through the disc portion 53i. That is, after being supplied through the first supply oil passage L1 and flowing out of the first opening 12, oil is supplied to outer friction plates 56a and inner friction plates 56b of the first clutch C1 through the oil hole 53g. The structure of a second supply oil passage L2 is similar to that of the second supply oil passage L2 in the first embodiment.

A discharge oil passage L3 extends radially in the end support wall 4, and axially in the axially protruding portion 5. As shown in FIGS. 7 and 9, in the present embodiment, the discharge oil passage L3 has the third opening 14 that is formed in the end face 5a located on the other axial side of the axially protruding portion 5, namely in the protruding direction of the axially protruding portion 5. The discharge oil passage L3 is a passage for discharging oil after the oil cools the outer friction plates 56a and the inner friction plates 56b, lubricates the thrust bearings 73a, 73e, and the like. In the present embodiment, the discharge oil flows into the discharge oil passage L3 through the oil hole 53g formed in the disc portion 53i of the first clutch drum 53.

In the present embodiment as well, the first supply oil passage L1 has an opening in the other axial end face 5a of the axially protruding portion 5. This can eliminate the need for a space that is required to form a radial oil hole, which communicates with the first supply oil passage L1, in the axially protruding portion 5 as compared to the case where the first supply oil passage L1 and the second supply oil passage L2 are formed so that the openings thereof are axially arranged in the outer peripheral surface 5b of the axially protruding portion 5. Thus, the axial length of the hybrid drive device 1 can be reduced by an amount corresponding to this space.

[Other Embodiments]

(1) The above embodiments are described with respect to an example in which the first clutch C1 provided in the case 2 is a predetermined element to be supplied with an oil pressure. However, embodiments of the present invention are not limited to this. That is, it is also one of preferred embodiments of the present invention to structure a vehicle drive device of the present invention in which, e.g., a gear mechanism such as a planetary gear mechanism is an element to be supplied with an oil pressure. In this case, if the planetary gear mechanism or the like as an element to be supplied with an oil pressure mainly needs only cooling or lubrication, only the first supply oil passage L1 for supplying oil to the planetary gear mechanism or the like, and the discharge oil passage L3 for discharging the supplied oil may be provided inside the end support wall 4 and the axially protruding portion 5.

(2) The above embodiments are described with respect to an example in which the first supply oil passage L1 is a supply passage for oil to be supplied to the outer friction plates 56a and the inner friction plates 56b of the first clutch C1, and the second supply oil passage L2 is a supply passage for oil to be supplied to the first engagement oil chamber H1. However, embodiments of the present invention are not limited to this. That is, it is also one of preferred embodiments of the present invention to switch the elements to which oil is supplied from the first supply oil passage L1 and the second supply oil passage L2 so that the first supply oil passage L1 serves as a supply passage for oil to be supplied to the first engagement oil chamber H1, and the second supply oil passage L2 serves as a supply passage for oil to be supplied to the outer friction plates 56a and the inner friction plates 56b of the first clutch C1.

(3) The above embodiments are described with respect to an example in which the hybrid drive device 1 includes the torque converter TC, and a part of the hydraulic transmission device support member 30 that supports the torque converter TC forms an accommodating member (in the present example, the first clutch drum 53) that accommodates the first clutch C1 as an element to be supplied with an oil pressure. However, embodiments of the present invention are not limited to this. That is, it is also one of preferred embodiments of the present invention that, e.g., the accommodating member that accommodates the first clutch C1 be structured as a dedicated member for accommodating the first clutch C1, instead of being structured as a part of the hydraulic transmission device support member 30, and that the accommodating member be directly connected to the intermediate shaft M not via the torque converter TC or the like.

(4) The above embodiments are described with respect to an example in which the end face located on the other axial side (on the torque converter TC side) of the cylindrical protruding portion 26 of the rotor support member 23 is in contact with the wall 53d of the first clutch drum 53 that forms a part of the hydraulic transmission device support member 30. However, embodiments of the present invention are not limited to this. That is, it is also one of preferred embodiments of the present invention that the end face located on one axial side (on the rotor support member 23 side) of the cylindrical protruding portion 53c of the first clutch drum 53 be in contact with the disc-shaped member of the rotor support member 23.

(5) The above embodiments are described with respect to an example in which the inner peripheral surface of the cylindrical protruding portion 26 fits on the outer peripheral surface of the cylindrical protruding portion 53*c* in the fitting portion between the cylindrical protruding portion 26 of the rotor support member 23 and the cylindrical protruding portion 53*c* of the first clutch drum 53. However, embodiments of the present invention are not limited to this. That is, it is also one of preferred embodiments of the present invention that the inner peripheral surface of the cylindrical protruding portion 53*c* fit on the outer peripheral surface of the cylindrical protruding portion 26.

(6) The above embodiments are described with respect to an example in which the engagement portion between the internal spline engagement groove 24*a* and the external spline engagement groove 53*b* are located radially outside the fitting portion between the cylindrical protruding portion 26 and the cylindrical protruding portion 53*c*. However, embodiments of the present invention are not limited to this. That is, it is also one of preferred embodiments of the present invention to switch the radial positions of the fitting portion and the spline engagement portion so that the engagement portion between the internal spline engagement groove 24*a* and the external spline engagement groove 53*b* is located radially inside the fitting portion between the cylindrical protruding portion 26 and the cylindrical protruding portion 53*c*. The rotor support member 23 and the first clutch drum 53, which forms a part of the hydraulic transmission device support member 30, may be fastened together by a fastening member such as bolts, or may be integrally fixed together by welding, instead of being connected together by spline engagement.

(7) The above embodiments are described with respect to an example in which the first clutch C1 is positioned on one axial side of the front cover 32 and outside the space surrounded by the front cover 32 and the rear cover 33 of the torque converter TC. However, embodiments of the present invention are not limited to this. For example, it is also one of preferred embodiments of the present invention that the first clutch C1 be positioned on the other axial side of the front cover 32, and both the second clutch C2 and the first clutch C1 be positioned in the space surrounded by the front cover 32 and the rear cover 33 of the torque converter TC. In this case, the hydraulic transmission device support member 30 is formed only by the front cover 32, the rear cover 33, and the pump hub 35.

Note that in this case, the first clutch C1 may be positioned so as not to axially overlap the rotor 22. That is, the first clutch C1 may be positioned so that each of the first clutch C1 and the rotor 22 does not have a part located at the same position as viewed axially. The first clutch C1 may be positioned so as to radially overlap the rotor 22. That is, the first clutch C1 may be positioned so that each of the first clutch C1 and the rotor 22 has at least a part located at the same position as viewed radially.

(8) The above embodiments are described with respect to an example in which the hybrid drive device 1 includes, as a hydraulic transmission device, the torque converter TC that includes the pump impeller 31, the turbine runner 41, and the stator 46. However, embodiments of the present invention are not limited to this. That is, it is also one of preferred embodiments of the present invention that the hybrid drive device 1 include other hydraulic transmission device such as a fluid coupling that has only the pump impeller 31 as a driving rotating member and the turbine runner 41 as a driven rotating member.

(9) The above embodiments are described with respect to an example in which the vehicle drive device of the present invention is applied to the hybrid drive device 1 for hybrid vehicles, which uses one or both of the engine E and the rotating electrical machine MG as a driving force source of the vehicle. However, embodiments of the present invention are not limited to this. That is, it is to be understood that the present invention may also be applied to vehicle drive devices for electric vehicles that include only the rotating electrical machine MG as a driving force source.

The present invention can be preferably used for vehicle drive devices that include a rotating electrical machine having a rotor that rotates about a central axis, a case that accommodates the rotating electrical machine, and an oil passage provided in the case to supply oil to a predetermined element to be supplied with an oil pressure.

What is claimed is:

1. A vehicle drive device, comprising:
   a rotating electrical machine having a rotor that rotates about a central axis;
   a case accommodating the rotating electrical machine; and
   an oil passage provided in the case to supply oil to a predetermined element to be supplied with an oil pressure, wherein
   the case has a support wall that extends at least radially, and an axially protruding portion that is cylindrically shaped and formed integrally with the support wall and protrudes axially from the support wall toward the rotating electrical machine,
   a rotor support member that extends at least radially to support the rotor is supported radially and axially so as to be rotatable with respect to the axially protruding portion via a support bearing that is provided on an outer peripheral surface or an inner peripheral surface of the axially protruding portion,
   the element to be supplied with the oil pressure is positioned on a side axially opposite to the support wall with respect to the rotor support member, and an accommodating member that accommodates the element to be supplied with the oil pressure is positioned axially in contact with the rotor support member,
   the vehicle drive device includes a supply oil passage to the element to be supplied with the oil pressure, which is provided inside the support wall and the axially protruding portion, and
   the supply oil passage has an end face opening that is formed in an end face located in a protruding direction of the axially protruding portion.

2. The vehicle drive device according to claim 1, wherein
   the element to be supplied with the oil pressure is a friction engagement device which has an engagement oil chamber and a plurality of friction materials, and whose engagement and disengagement are controlled by controlling a supply pressure of oil to the engagement oil chamber,
   the supply oil passage and the end face opening serve as a first supply oil passage and a first opening, respectively,
   in addition to the first supply oil passage, the vehicle drive device further includes a second supply oil passage, which is formed inside the support wall and the axially protruding portion, and has a second opening that is formed in the outer peripheral surface of the axially protruding portion, and
   the first supply oil passage serves as a supply passage for oil to be supplied to the friction materials, and the second supply oil passage serves as a supply passage for oil to be supplied to the engagement oil chamber.

3. The vehicle drive device according to claim 1, wherein
   the supply oil passage and the end face opening serve as a first supply oil passage and a first opening, respectively, and in addition to the first supply oil passage, the vehicle drive device further includes a discharge oil passage, which is formed inside the support wall and the axially protruding portion, and has a discharge opening that is formed in the end face located in the protruding direction of the axially protruding portion or in the inner peripheral surface of the axially protruding portion.

4. The vehicle drive device according to claim 1, further comprising:
a hydraulic transmission device having a driving rotating member and a driven rotating member, and structured to be able to transfer a driving force via a fluid contained in the hydraulic transmission device; and
a hydraulic transmission device support member that forms the accommodating member and also supports the hydraulic transmission device, wherein
the hydraulic transmission device support member is connected to the rotor support member, and axially on the support wall side of the hydraulic transmission device, the hydraulic transmission device support member is supported radially and axially so as to be rotatable with respect to the axially protruding portion via the support bearing.

5. The vehicle drive device according to claim 4, wherein
the rotor support member has a cylindrical inner peripheral surface portion, an internal spline engagement groove formed in the inner peripheral surface portion, and a first cylindrical protruding portion that that is cylindrically shaped and protrudes axially toward the hydraulic transmission device support member,
the hydraulic transmission device support member has a cylindrical outer peripheral surface portion, an external spline engagement groove formed in the outer peripheral surface portion, and a second cylindrical protruding portion that is cylindrically shaped and protrudes axially toward the rotor support member,
the internal spline engagement groove engages with the external spline engagement groove, and the first cylindrical protruding portion fits on the second cylindrical protruding portion so as to restrict radial relative movement between the rotor support member and the hydraulic transmission device support member, and
an axial end face of the first cylindrical protruding portion is in contact with the hydraulic transmission device support member, or an axial end face of the second cylindrical protruding portion is in contact with the rotor support member.

6. The vehicle drive device according to claim 1, wherein
the element to be supplied with the oil pressure is positioned radially inside the rotor so as to axially overlap the rotor.

* * * * *